(12) United States Patent
Fukazawa et al.

(10) Patent No.: US 9,361,511 B2
(45) Date of Patent: Jun. 7, 2016

(54) INFORMATION PROCESSING APPARATUS, INFORMATION PROCESSING METHOD, AND PROGRAM

(71) Applicant: SONY CORPORATION, Tokyo (JP)

(72) Inventors: Kentaro Fukazawa, Tokyo (JP); Kenji Tanaka, Kanagawa (JP); Yoshihiro Takahashi, Kanagawa (JP); Kyosuke Yoshida, Kanagawa (JP); Kazumasa Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 14/157,595

(22) Filed: Jan. 17, 2014

(65) Prior Publication Data

US 2014/0205158 A1    Jul. 24, 2014

(30) Foreign Application Priority Data

Jan. 21, 2013   (JP) ................. 2013-008368

(51) Int. Cl.
*G06K 9/00*     (2006.01)
*G06K 9/62*     (2006.01)

(52) U.S. Cl.
CPC .............. *G06K 9/00288* (2013.01); *G06K 9/00* (2013.01); *G06K 9/00718* (2013.01); *G06K 9/6218* (2013.01)

(58) Field of Classification Search
CPC ......... G01J 3/508; G01J 3/0278; G01J 3/463; A61B 5/7264; G06K 9/00288; G06K 9/00228; G06K 9/00597; G06K 9/6202; G06K 9/00677; G06K 9/036; G06K 9/6255; G06K 9/00281; G06K 9/00268; G06K 9/00221; G06K 9/00684; G06K 9/00369; G06F 21/10; G06F 17/30259; G06F 17/30244; G06F 17/30247; G06F 17/2765; G06F 3/0481; G06T 17/00; H04N 13/0275; H04N 1/3878; H04N 21/466; G06Q 40/00; G06Q 40/04; G06Q 40/06; G06Q 10/10; G05B 19/042; H04H 60/46
USPC ......... 382/103, 107, 118, 151, 154, 159, 173, 382/218, 104, 128, 190, 209, 282, 305
See application file for complete search history.

(56) References Cited

U.S. PATENT DOCUMENTS

| 5,809,202 | A * | 9/1998 | Gotoh | G11B 27/105 358/909.1 |
|---|---|---|---|---|
| 6,853,389 | B1 * | 2/2005 | Ikeda | G06F 17/30259 345/156 |
| 7,130,466 | B2 * | 10/2006 | Seeber | G06F 17/30256 382/190 |
| 8,135,239 | B2 * | 3/2012 | Kojima | G06F 3/1415 382/159 |
| 2002/0044691 | A1 * | 4/2002 | Matsugu | G06K 9/20 382/218 |
| 2003/0039378 | A1 * | 2/2003 | Yuasa | G06K 9/00805 382/104 |
| 2005/0157908 | A1 * | 7/2005 | Matsugu | G06K 9/00342 382/107 |

(Continued)

*Primary Examiner* — Vu Le
*Assistant Examiner* — Aklilu Woldemariam
(74) *Attorney, Agent, or Firm* — Frommer Lawrence & Haug LLP; William S. Frommer; Ellen Marcie Emas

(57) ABSTRACT

An information processing apparatus includes a grouping unit that detects a part of an object from contents and performs grouping of each object, a correlation degree calculating unit that calculates a correlation degree between the objects of which the grouping is performed by the grouping unit, and a display control unit that controls a display of a diagram of a correlation between the objects indicating the correlation between the objects, based on the correlation degree between the objects which is calculated by the correlation degree calculating unit.

29 Claims, 17 Drawing Sheets

(56) References Cited

U.S. PATENT DOCUMENTS

| | | | |
|---|---|---|---|
| 2006/0072799 A1* | 4/2006 | McLain | G06T 5/009 382/128 |
| 2008/0074503 A1* | 3/2008 | Nagaoka et al. | 348/207.99 |
| 2008/0075388 A1* | 3/2008 | Nishijima | G06K 9/00228 382/282 |
| 2008/0253662 A1* | 10/2008 | Funaki | G06K 9/00221 382/209 |
| 2009/0279840 A1* | 11/2009 | Kudo | G11B 27/031 386/278 |
| 2010/0250601 A1* | 9/2010 | Takata | H04N 9/8205 707/780 |
| 2010/0322518 A1* | 12/2010 | Prasad | G06T 7/0081 382/173 |
| 2011/0001840 A1* | 1/2011 | Ishii | G02B 7/365 348/222.1 |
| 2011/0311112 A1* | 12/2011 | Matsuyama | G06K 9/00295 382/118 |
| 2011/0317928 A1* | 12/2011 | Yabu | G06K 9/00677 382/225 |
| 2012/0014562 A1* | 1/2012 | Berkovich | G06K 9/00228 382/103 |
| 2012/0057775 A1* | 3/2012 | Suzuki | H04N 5/76 382/154 |
| 2012/0251002 A1* | 10/2012 | Gotoh | H04N 19/50 382/173 |
| 2012/0256964 A1* | 10/2012 | Hirota | G06K 9/00221 345/666 |
| 2012/0290589 A1* | 11/2012 | Kubo | G06F 17/30259 707/752 |
| 2012/0294496 A1* | 11/2012 | Nakamoto | G06K 9/00288 382/118 |
| 2013/0028521 A1* | 1/2013 | Yabu | G06T 11/60 382/195 |
| 2013/0129160 A1* | 5/2013 | Yamada | G06K 9/00268 382/118 |
| 2013/0202163 A1* | 8/2013 | Shimada | G06K 9/00268 382/118 |
| 2013/0243278 A1* | 9/2013 | Saito | G06K 9/00281 382/128 |
| 2014/0198234 A1* | 7/2014 | Kobayashi | H04N 1/2129 348/231.99 |

\* cited by examiner

FIG. 17

|  | CANDIDATE OF FACE B | | |
|---|---|---|---|
|  | PERSON 3 | PERSON 2 | PERSON 6 |
| CANDIDATE OF FACE A — PERSON 1 | 0.1 | 0.2 | 0.8 |
| CANDIDATE OF FACE A — PERSON 5 | 0.0 | 0.0 | 0.3 |

FIG. 18

|  | CANDIDATE OF FACE B | | |
|---|---|---|---|
|  | PERSON 3 SIMILARITY: 0.7 | PERSON 2 SIMILARITY: 0.6 | PERSON 6 SIMILARITY: 0.5 |
| CANDIDATE OF FACE A — PERSON 1 SIMILARITY: 0.9 | 0.1 (=0.063) | 0.2 (=0.108) | 0.8 (=0.36) |
| CANDIDATE OF FACE A — PERSON 5 SIMILARITY: 0.6 | 0.0 (=0.0) | 0.0 (=0.0) | 0.3 (=0.09) |

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2013-008368 filed Jan. 21, 2013, the entire contents of which are incorporated herein by reference.

BACKGROUND

The present disclosure relates to an information processing apparatus, an information processing method and a program, particularly, to an information processing apparatus, an information processing method and a program that enable obtaining a correlation degree between objects in contents, more accurately.

In Japanese Unexamined Patent Application Publication (Translation of PCT Application) No. 2011-133988, one of the related art for obtaining a diagram of a correlation between persons from plural still images and plural moving images, is disclosed. In the technology which is described in Japanese Unexamined Patent Application Publication (Translation of PCT Application) No. 2011-133988, a face is extracted from the image, a correlation degree between the persons is calculated from a frequency of recording at the same time, and the diagram of the correlation between the persons is obtained.

Moreover, a technology that a digest moving image is generated by extracting only the image where the specified one person appears, the image where the specified plural persons appear, and the sections thereof from the plural still images and the plural moving images, is disclosed in Japanese Unexamined Patent Application Publication No. 2011-82915 and Japanese Unexamined Patent Application Publication No. 2011-70277.

Furthermore, in Japanese Unexamined Patent Application Publication No. 2008-129682, a technology which improves performance of personal identification using the correlation between the plural persons is disclosed.

SUMMARY

However, in Japanese Unexamined Patent Application Publication (Translation of PCT Application) No. 2011-133988, Japanese Unexamined Patent Application Publication No. 2011-82915, Japanese Unexamined Patent Application Publication No. 2011-70277 and Japanese Unexamined Patent Application Publication No. 2008-129682, when the plural persons alternately appear in terms of time by individually shooting with plural cameras without appearing at the same time on the screen, the plural persons are not recorded at the same time, and thus, it is determined that a correlation degree between the plural persons is low.

The present disclosure is made in view of such circumstances, and thus, enables obtaining a correlation degree between objects in contents, more accurately.

According to an embodiment of the present disclosure, there is provided an information processing apparatus including a grouping unit that detects a part of an object from contents and performs grouping of each object, a correlation degree calculating unit that calculates a correlation degree between the objects of which the grouping is performed by the grouping unit, and a display control unit that controls a display of a diagram of a correlation between the objects indicating the correlation between the objects, based on the correlation degree between the objects which is calculated by the correlation degree calculating unit.

In the embodiment, the correlation degree calculating unit may include an appearance section obtaining unit that obtains an appearance section of each object, a simultaneous appearance correlation degree calculating unit that calculates the correlation degree from a frequency where a plurality of objects appear at the same time, based on the appearance section of each object which is obtained by the appearance section obtaining unit, and a transition appearance correlation degree calculating unit that calculates the correlation degree from a frequency where the plurality of objects appear by transiting in terms of time, based on the appearance section of each object which is obtained by the appearance section obtaining unit.

In the embodiment, the display control unit may control the display of a width of a link showing a relationship degree between the objects in the diagram of the correlation between the objects, based on the correlation degree between the objects which is calculated by the simultaneous appearance correlation degree calculating unit and the transition appearance correlation degree calculating unit.

In the embodiment, the simultaneous appearance correlation degree calculating unit may calculate an importance degree of each object, based on the appearance section of each object which is obtained by the appearance section obtaining unit, and the display control unit may control the display of a size of an object image showing the object in the diagram of the correlation between the objects, based on the importance degree of each object which is calculated by the simultaneous appearance correlation degree calculating unit.

In the embodiment, the display control unit may control a moving image display in the diagram of the correlation between the objects, based on the correlation degree between the objects which is calculated at each predetermined time interval by the simultaneous appearance correlation degree calculating unit and the transition appearance correlation degree calculating unit.

In the embodiment, the display control unit may control a display on a timeline in the diagram of the correlation between the objects, based on the correlation degree between the objects which is calculated at each predetermined time interval by the simultaneous appearance correlation degree calculating unit and the transition appearance correlation degree calculating unit.

In the embodiment, the information processing apparatus may further include a digest generating unit that generates a digest of the contents to be configured by a scene where the plurality of objects which are connected with the selected object image or the selected link appear, depending on selection of the object image or the link showing the relationship degree between the objects, in the diagram of the correlation between the objects of which the display is controlled by the display control unit.

In the embodiment, the information processing apparatus may further include a cut point inserting unit that inserts a cut point into the scene where the plurality of objects which are connected with the selected object image or the selected link appear, depending on the selection of the object image or the link showing the relationship degree between the objects, in the diagram of the correlation between the objects of which the display is controlled by the display control unit.

In the embodiment, the information processing apparatus may further include a database of the correlation degree between persons that stores the correlation degree between the objects which is calculated by the simultaneous appearance correlation degree calculating unit and the transition appearance correlation degree calculating unit.

In the embodiment, the information processing apparatus may further include an input unit that inputs an object name, and a search unit that searches for the correlation degree of the object corresponding to the object name which is input by the input unit, from the database of the correlation degree between the persons, in which the display control unit may control the display of the diagram of the correlation between the objects centering around the object which is searched for by the search unit.

In the embodiment, the information processing apparatus may further include an input unit that inputs a setting of the diagram of the correlation between the objects, and a search unit that searches for the correlation degree of the object corresponding to the setting of the diagram of the correlation between the objects which is input by the input unit, from the database of the correlation degree between the persons.

In the embodiment, the information processing apparatus may further include a candidate obtaining unit that obtains a candidate list by detecting all faces that appear in the image and adding a person having a large similarity degree with respect to the detected face, using the database of the correlation degree between the persons, and a person determining unit that determines the person, using the candidate list which is obtained by the candidate obtaining unit.

In the embodiment, the person determining unit may determine the person, taking the correlation degree of the candidate list which is obtained by the candidate obtaining unit as an evaluation value.

In the embodiment, the person determining unit may determine the person, taking a value which is obtained by the combination of the correlation degree of the candidate list which is obtained by the candidate obtaining unit and the similarity degree of each person as an evaluation value.

In the embodiment, the part of the object is a face image, and the object is a person.

According to another embodiment of the present disclosure, there is provided an information processing method including, by an information processing apparatus, detecting a part of an object from contents and performing grouping of each object, calculating a correlation degree between the objects of which the grouping is performed, and controlling a display of a diagram of a correlation between the objects indicating the correlation between the objects, based on the correlation degree between the objects which is calculated.

According to still another embodiment of the present disclosure, there is provided a program causing a computer to function as a grouping unit that detects a part of an object from contents and performs grouping of each object, a correlation degree calculating unit that calculates a correlation degree between the objects of which the grouping is performed by the grouping unit, and a display control unit that controls a display of a diagram of a correlation between the objects indicating the correlation between the objects, based on the correlation degree between the objects which is calculated by the correlation degree calculating unit.

In the embodiments of the present disclosure, a part of an object from contents is detected, grouping of each object is performed, and correlation degree between the objects of which the grouping is performed is calculated. A display of a diagram of a correlation between the objects indicating the correlation between the objects is controlled, based on the correlation degree between the objects which is calculated.

According to the embodiments of the present disclosure, it is possible to obtain correlation degree between objects in contents, more accurately.

BRIEF DESCRIPTION OF THE DRAWINGS

FIG. 17 is a diagram illustrating an example of a processing of determining the person;

FIG. 18 is a diagram illustrating another example of the processing of determining the person.

DETAILED DESCRIPTION OF EMBODIMENTS

Hereinafter, embodiments for carrying out the present disclosure (hereinbelow, referred to as embodiment) will be described. The description is performed in the following order.

1. Embodiment (Information Processing Apparatus)
2. Embodiment (Display Example)
3. Embodiment (Modification Example)

1. Embodiment

Information Processing Apparatus

Configuration of Information Processing Apparatus of Present Technology

Figure 1:
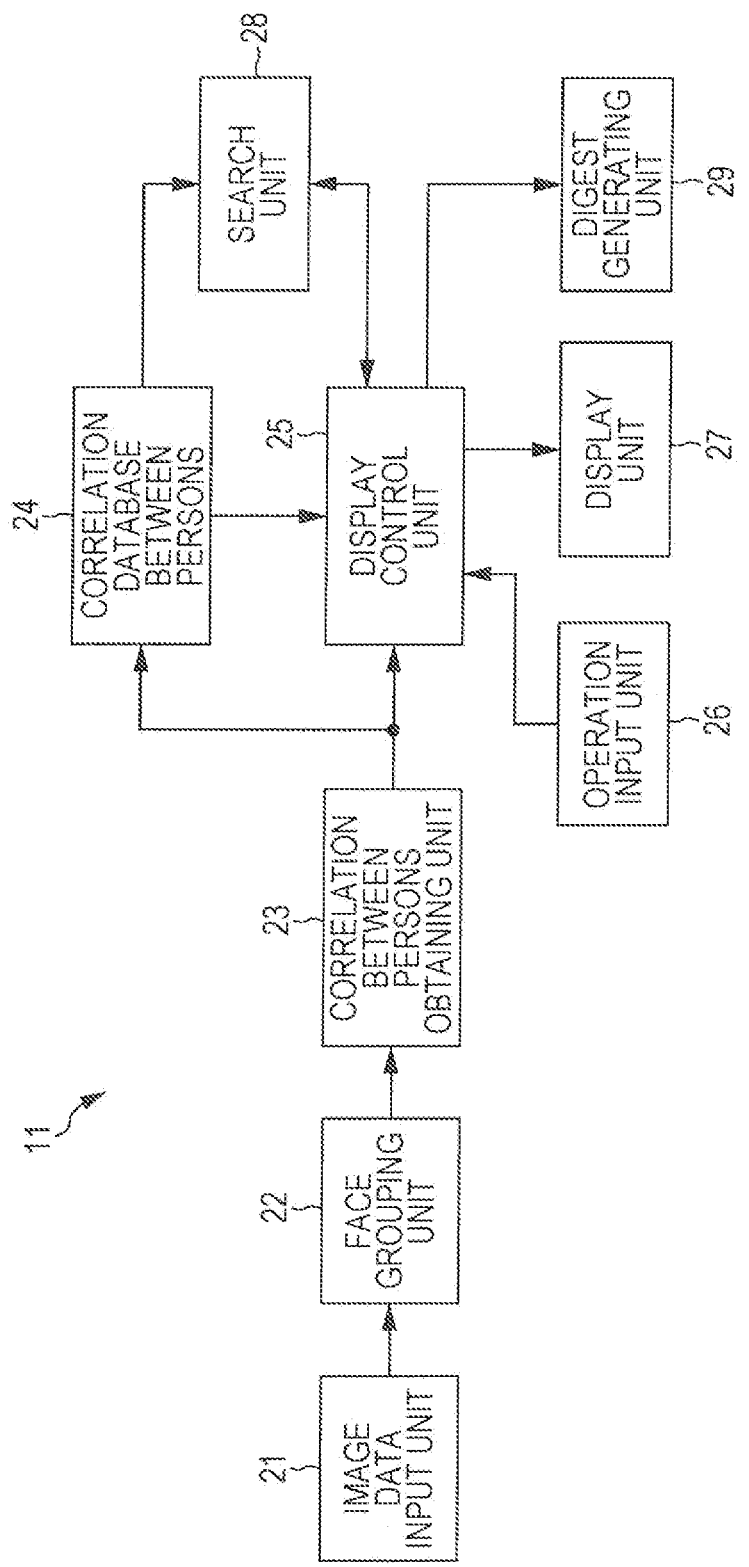
FIG. 1 is a block diagram illustrating a configuration example of an information processing apparatus to which the present technology is applied.

FIG. 1 is a diagram illustrating a configuration example of an information processing apparatus to which the present technology is applied.

In FIG. 1, an information processing apparatus 11 obtains correlation between persons who appear in video contents, and performs a showing of a diagram of the correlation between the persons. Furthermore, the information processing apparatus 11 performs a search for the video contents using a personal name with a search key or the diagram of the correlation between the persons. Alternatively, the information processing apparatus 11 performs a personal identification using the obtained correlation. For example, the information processing apparatus 11 is configured by a personal computer.

The present technology is not limited to the correlation between the persons to be described, but also applied to the correlation between a person and an object, and to the correlation between objects.

In an example of FIG. 1, the information processing apparatus 11 is configured to include an image data input unit 21, a face grouping unit 22, a correlation degree between persons obtaining unit 23, a database of the correlation degree between the persons 24, a display control unit 25, an operation input unit 26, and a display unit 27. Furthermore, the information processing apparatus 11 is configured to include a search unit 28 and a digest generating unit 29.

The image data input unit 21 inputs data of the video contents from content archives which are not shown, and supplies the input data of the video contents (moving image file) to the face grouping unit 22.

The face grouping unit 22 detects a face image that appears in the video contents, performs the grouping of the detected face image according to each person, and supplies grouping information of each person along with the moving image file to the correlation degree between persons obtaining unit 23.

The correlation degree between persons obtaining unit 23 calculates the correlation degree between the persons which is grouped by the face grouping unit 22, and supplies the calculated correlation degree between the persons to the display control unit 25. Furthermore, the correlation degree between persons obtaining unit 23 supplies the calculated correlation degree between the persons along with the moving image file to the database of the correlation degree between the persons 24.

The database of the correlation degree between the persons 24 stores data of the correlation degree between the persons in association with the moving image file from the correlation degree between persons obtaining unit 23.

For example, the data of the correlation degree between the persons is configured of information relating to the moving image file, information relating to each people to appear (appearance), and information relating to the person between two persons.

For example, the information relating to the moving image file is formed of the moving image file name, the time range of the moving image file or the like. For example, the information relating to each person to appear is formed of the importance degree of each person to appear, an appearance frame of each person to appear, a position of the face, a size of the face, a personal name of each person to appear, face image feature amount of each person to appear, a voice feature amount of each person to appear or the like. For example, the information relating to the person between two persons is formed of the correlation degree between two persons, the time range where two persons appear or the like.

The display control unit 25 generates a diagram of the correlation between the persons indicating the correlation degree between the persons and displays the generated diagram of the correlation between the persons on the display unit 27, based on the correlation degree between persons obtaining unit 23 and the data of correlation degree between the persons from the search unit 28. For example, in the case of plural persons, the diagram of the correlation between the persons is configured by the combination of the face image showing at least one person with a line indicating the relationship between the persons (link) so as to tell at a glance the relationship between the persons within the video contents.

For example, the operation input unit 26 is configured of a mouse, a keyboard, a touch panel to be laminated on the display unit 27 or the like, and supplies a signal corresponding to the operation of a user to the display control unit 25. For example, the selection signal of the person and the link is supplied to the digest generating unit 29 via the display control unit 25, in the diagram of the correlation between the persons. Furthermore, for example, the personal name in the case of performing the video content search, is supplied to the search unit 28 via the display control unit 25.

For example, the display unit 27 is configured of LCD (Liquid Crystal Display) or the like, and displays the diagram of the correlation between persons from the display control unit 25.

The search unit 28 is supplied with the personal name from the display control unit 25, and obtains the data of the correlation degree by searching the database of the correlation degree between the persons 24, in order to display the diagram of the correlation between the persons centering around the supplied person. The search unit 28 performs the face grouping, and obtains the importance degree of each person and the correlation degree between the persons, using the face image feature amounts of all the persons which are written in total data of the correlation degree. The search unit 28 supplies the obtained importance degree of each person and the obtained correlation degree between the persons to the display control unit 25.

The digest generating unit 29 performs the generation of the digest and an insertion of a cut point, depending on the selection signal of the person and the link, in the diagram of the correlation between the persons from the operation input unit 26.

Operation of Information Processing Apparatus

Next, a processing of obtaining and displaying the correlation degree between the persons in the information processing apparatus 11 will be described, with reference to a flowchart of FIG. 2.

The image data input unit 21 inputs the data of the video contents from the archives which are not shown, and supplies the input data of the video contents to the face grouping unit 22.

In accordance with this, the face grouping unit 22 performs a processing of the face grouping in step S11. The processing of the face grouping will be described later, with reference to FIG. 3.

According to the processing of step S11, the face image to appear within the video contents is detected, the detected face image are grouped for each person, and the grouping information of each person, along with the data of the video contents, is supplied to the correlation degree between persons obtaining unit 23.

In step S12, the correlation degree between persons obtaining unit 23 performs the processing of obtaining the correlation degree between the persons. The processing of obtaining the correlation degree between the persons will be described later, with reference to FIG. 6.

According to the processing of step S12, the correlation degree between the persons which is grouped by the face grouping unit 22 is calculated, and the calculated correlation degree between the persons, along with the data of the video contents, is supplied to the database of the correlation degree between the persons 24.

In response to this, in step S13, the database of the correlation degree between the persons 24 registers the data of the correlation degree between the persons, in association with the data of the video contents.

On the other hand, the data of the correlation degree between the persons which is calculated by the correlation degree between persons obtaining unit 23 is supplied to the display control unit 25, along with the data of the video contents.

In step S14, the display control unit 25 performs the display of the diagram of the correlation between the persons indicating the correlation between the persons. That is, the display control unit 25 generates the diagram of the correlation between the persons, based on the data of the correlation degree between the persons from the correlation degree between persons obtaining unit 23, and displays the generated diagram of the correlation between the persons on the display unit 27.

If the display of the diagram of the correlation between the persons is controlled in the above manner, it is possible to grasp at a glance the relationship between the persons within the moving image file.

Example of Processing of Face Grouping

Next, the processing of the face grouping in step S11 of FIG. 2 will be described, with reference to a flowchart of FIG. 3. The processing is performed with respect to the entire video at an optional time interval from a head frame of the video.

In step S31, the face grouping unit 22 determines whether or not the face image is detected. If it is determined that the face image is detected in step S31, the processing proceeds to step S32.

In step S32, the face grouping unit 22 determines whether or not the number of the current group is greater than 0. In step S32, if it is determined that the number of the current group is one or more, the processing proceeds to step S33.

In step S33, the face grouping unit 22 performs similarity degree evaluation of each group. In other words, the face grouping unit 22 evaluates the similarity degree between the face image which is registered in the existing group and the face image which is detected at present.

In step S34, the face grouping unit 22 determines whether or not the largest similarity degree which is calculated in each group (maximum similarity degree) is greater than the threshold. In step S34, if it is determined that the maximum similarity degree is greater than the threshold, the processing proceeds to step S35.

In step S35, the face grouping unit 22 adds the detected face image to the group of the maximum similarity degree. That is, the face grouping unit 22 adds the detected face image as a member of the group, assuming that the detected face image is the same face as the face of person to be registered in the group where the maximum similarity degree is calculated.

On the other hand, in step S32, if it is determined that the number of the current group is 0, the processing proceeds to step S36. Moreover, in step S34, if it is determined that the maximum similarity degree is equal to or less than the threshold, it is assumed that the detected face image is different with the face of all group, the processing proceeds to step S36. In step S36, the face grouping unit 22 generates a new face group, and adds the detected face image as a member thereof.

In step S31, if it is determined that the face image is not detected, the processing proceeds to step S37. In step S37, the face grouping unit 22 determines whether or not all frames to form the moving image end.

In step S37, if it is determined that all frames do not end, the processing returns to step S31. Therefore, in the frame of the optional time interval, the subsequent processing is repeated.

Figure 2:
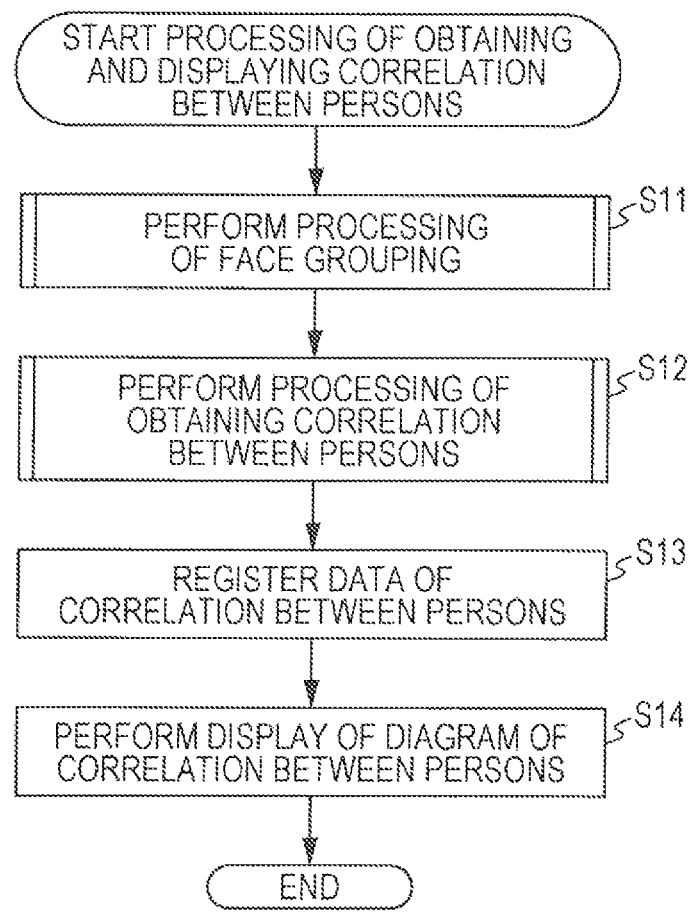
FIG. 2 is a flow chart illustrating a processing of obtaining and displaying a correlation degree between persons in the information processing apparatus.
Figure 3:
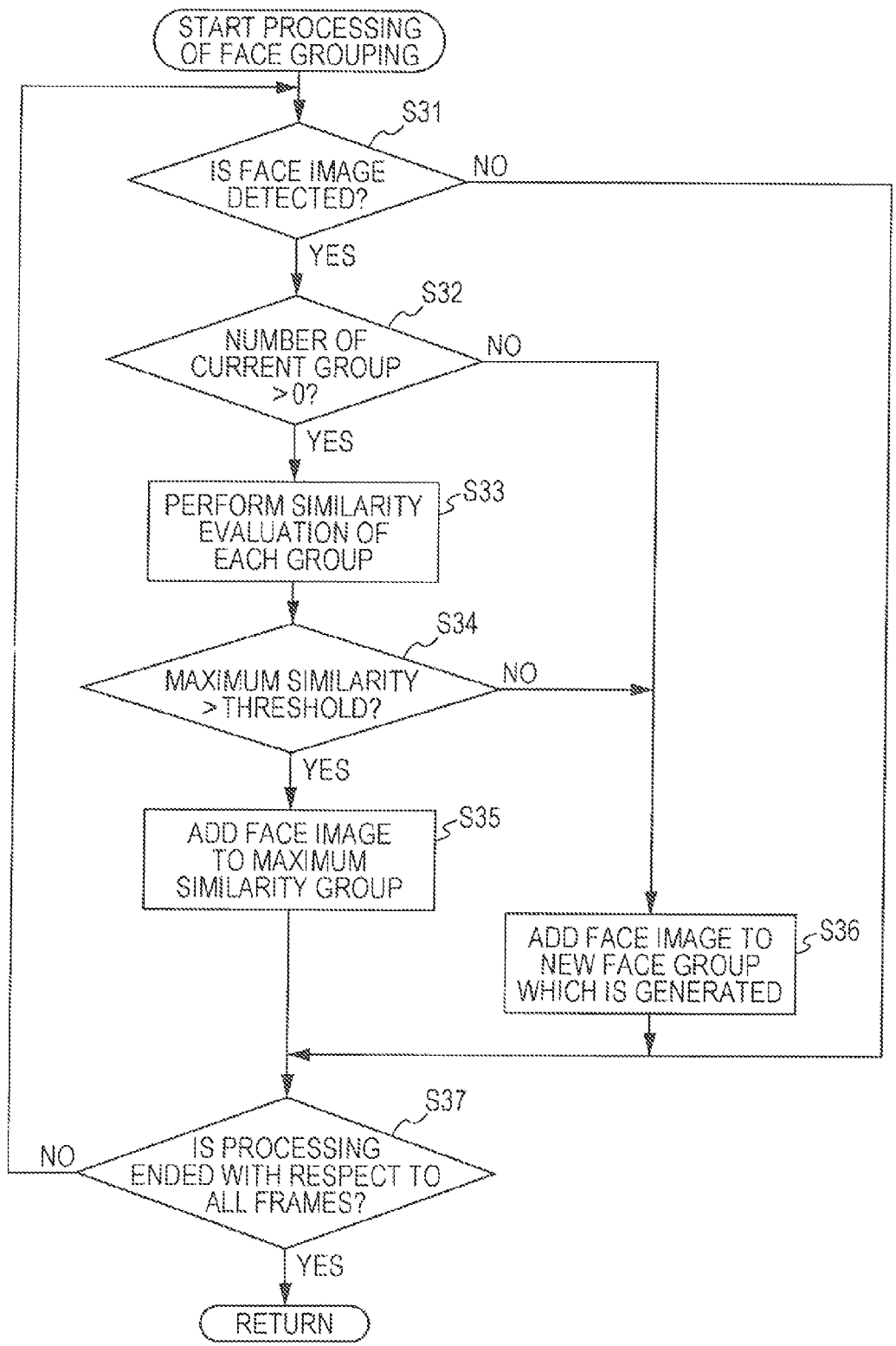
FIG. 3 is a flowchart illustrating a processing of a face grouping.

In step S37, if it is determined that all frames end, the processing of the face grouping is ended, and the processing returns to step S11 of FIG. 2.

However, the processing of the face grouping is not limited to the processing which is described with reference to FIG. 3, and may use any manner of grouping if possible. Furthermore, in the processing of the face grouping, the personal name corresponding to each group may be assigned, using a function of the personal identification which is described later with reference to FIG. 15 and the subsequent drawings.

Moreover, in the above description, when the processing is performed in the frame of the optional time interval, an example thereof is described, but may be performed per frame.

Configuration Example of Correlation Degree Between Persons Obtaining Unit

Figure 4:
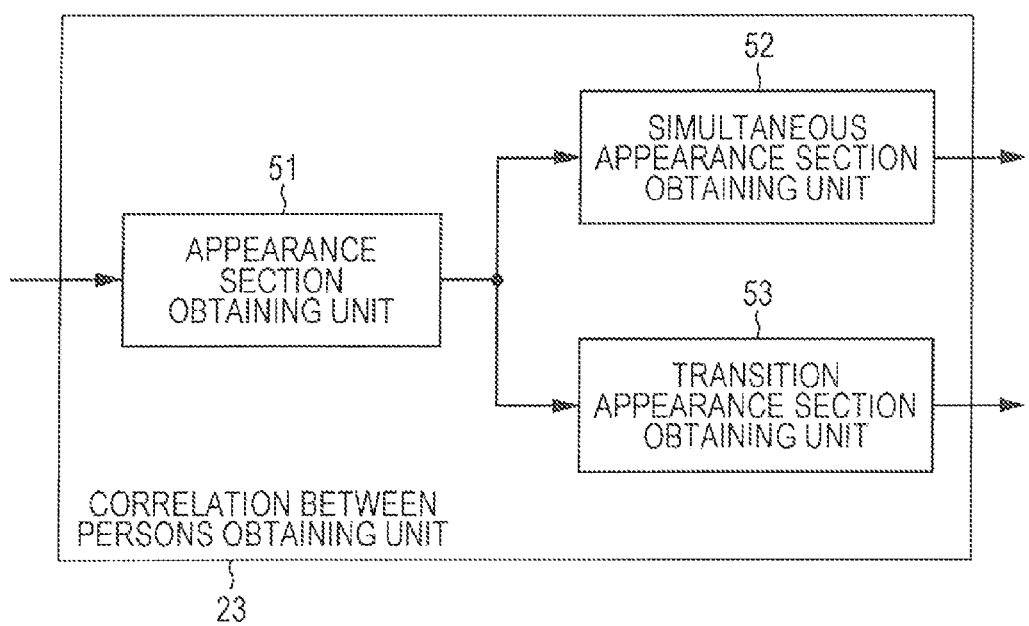
FIG. 4 is a block diagram illustrating a configuration example of a correlation degree between persons obtaining unit.

FIG. 4 is a diagram illustrating a configuration example of the correlation degree between persons obtaining unit of FIG. 1.

In the example of FIG. 4, the correlation degree between persons obtaining unit 23 is configured to include an appearance section obtaining unit 51, a simultaneous appearance section obtaining unit 52, and a transition appearance section obtaining unit 53.

The appearance section obtaining unit 51 obtains the appearance section of each face group which is grouped by the face grouping unit 22 from the moving image file, and supplies the obtained appearance section information to the simultaneous appearance section obtaining unit 52 and the transition appearance section obtaining unit 53.

The simultaneous appearance section obtaining unit 52 calculates a frequency where plural persons (face group) appear at the same time, based on the appearance section of each face group which is obtained by the appearance section obtaining unit 51, and obtains the data of the correlation degree between the persons from the calculated frequency. Furthermore, the simultaneous appearance section obtaining unit 52 obtains the data of the importance degree of each face group, based on the appearance section of each face group which is obtained by the appearance section obtaining unit 51.

The transition appearance section obtaining unit 53 calculates a frequency where plural persons appear by transiting in terms of time, and obtains the data of the correlation degree between the persons from the calculated frequency. The appearance scene by transiting in terms of time means the scene where the faces of two persons alternately appear such as the talking scene of two persons, for example, the scene of individually shooting the speakers with two cameras and switching the camera in the case of changing the speaker.

The data of the correlation degree between the persons and the data of the importance degree which are obtained by the simultaneous appearance section obtaining unit 52, and, the data of the correlation degree between the persons which is obtained by the transition appearance section obtaining unit 53, along with the moving image file, are supplied to the database of the correlation degree between the persons 24 and the display control unit 25.

Example of Appearance Section

Figure 5:
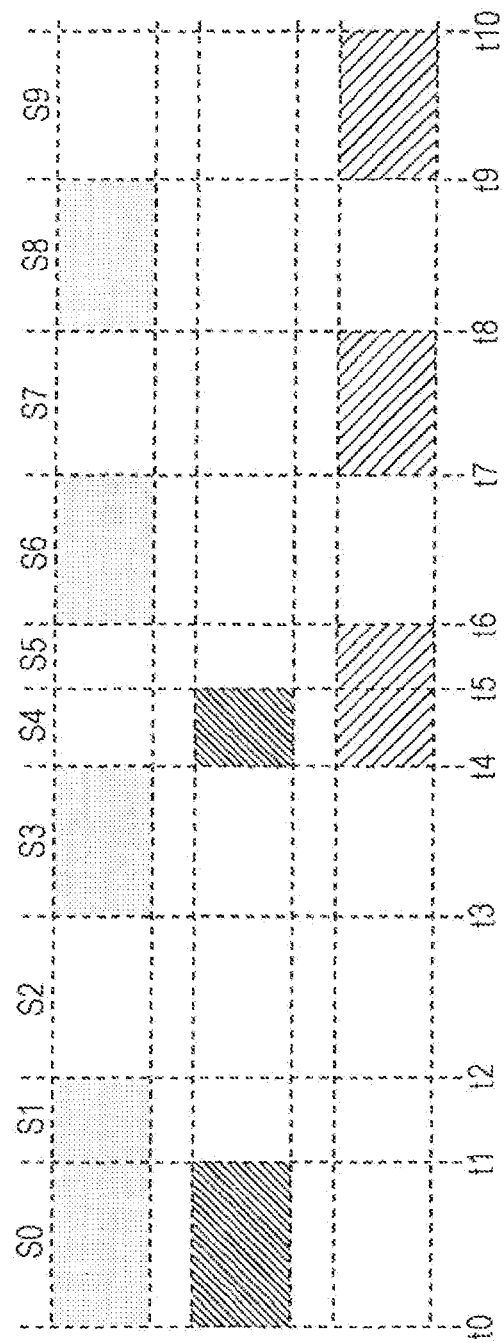
FIG. 5 is a diagram illustrating an example of an appearance section of a person in a video file.

FIG. 5 is a diagram illustrating an example of the appearance section of the person in the video file.

In the video file, a person a appears in a section S0 of timing t0 to t1, a section S1 of timing t1 to t2, a section S3 of timing t3 to t4, a section S6 of timing t6 to t7, and a section S8 of timing t8 to t9.

In the video file, a person b appears in the section S0 of timing t0 to t1, and a section S4 of timing t4 to t5.

In the video file, a person c appears in the section S4 of timing t4 to t5, a section S5 of timing t5 to t6, a section S7 of timing t7 to t8, and a section S9 of timing t9 to t10.

In the appearance sections as described above, the simultaneous appearance section where the person a and the person b appear at the same time is the section S0, and the simultaneous appearance section of the person b and the person c is the section S4.

On the other hand, the transition appearance section where the person a and the person c alternately appear is the section S3 to the section S9.

Example of Processing of Obtaining Correlation Degree Between Persons

Next, the processing of obtaining the correlation degree between the persons in step S12 of FIG. 2 will be described, with reference to a flowchart of FIG. 6.

In step S51, the appearance section obtaining unit 51 obtains the appearance section of each face group (that is, person) which is grouped by the face grouping unit 22, from the moving image file.

In step S52, the appearance section obtaining unit 51 divides the section into a start position and an end position of each appearance section. The appearance section obtaining unit 51 supplies the information of the appearance section including the start position and the end position to the simultaneous appearance section obtaining unit 52 and the transition appearance section obtaining unit 53.

In step S53, the simultaneous appearance section obtaining unit 52 performs the processing of obtaining the simultaneous appearance section. The processing of obtaining the simultaneous appearance section will be described later with reference to FIG. 7, but, according to the processing of step S53, the data of the importance degree of each person and the data of the correlation degree in the simultaneous appearance section are obtained, and the obtained data is supplied to the database of the correlation degree between the persons 24 and the display control unit 25.

In step S54, the transition appearance section obtaining unit 53 performs the processing of obtaining the transition appearance section. The processing of obtaining the transition appearance section will be described later with reference to FIG. 8, but according to the processing of step S54, the data of the correlation degree in the transition appearance section is obtained, and the obtained data is supplied to the database of the correlation degree between the persons 24 and the display control unit 25.

After step S54, the processing of obtaining the correlation degree between the persons ends, and the processing returns to step S12 of FIG. 2.

Example of Processing of Obtaining Simultaneous Appearance Section

Next, the processing of obtaining the simultaneous appearance section in step S53 of FIG. 6 will be described, with reference to a flowchart of FIG. 7. In the processing, it is determined whether the face appears as a target section in order from the head section S0 in FIG. 5.

In step S71, the simultaneous appearance section obtaining unit 52 determines whether or not the number of faces in the target section is greater than 0. In step S71, if it is determined that the number of faces is equal to or greater than 1, the processing proceeds to step S72.

In step S72, the simultaneous appearance section obtaining unit 52 obtains the data of the importance degree of each face (person). Here, a length of the target section, the size of the face within the target section, the average value of the appearance position, and the average value of the number of persons who appear at the same time are obtained, as the data of the importance degree.

In step S73, the simultaneous appearance section obtaining unit 52 determines whether or not another person is present in the same section. In step S73, if it is determined that another person is present in the same section, the processing proceeds to step S74.

In step S74, the simultaneous appearance section obtaining unit 52 obtains the data of the correlation degree of each face combination. That is, in step S74, the average values of the length of the target section, a ratio of the sizes of the faces between both persons, a distance of the faces between both persons and the number of persons who appear at the same time, are respectively obtained, as the data of the correlation degree between the persons.

In step S71, if it is determined that the number of faces is 0, the processing of step S72 to step S74 is skipped and the processing proceeds to step S75. Moreover, if it is determined that another person is not present in the same section in step 373, step S74 is skipped and the processing proceeds to step S75.

In step S75, the simultaneous appearance section obtaining unit 52 determines whether or not all the sections end. In step S75, if it is determined that all the sections do not end, the processing proceeds to step S76. In step S76, the simultaneous appearance section obtaining unit 52 updates the target section to the next section, the processing returns to the step S71, and the subsequent processing is repeated for the updated section.

In the manner described above, the data of the correlation degree is obtained from the frequency where plural persons appear at the same time, furthermore, the data of the importance degree is obtained from an appearance frequency of each person.

Example of Processing of Obtaining Correlation Degree Between Persons

Figure 8:
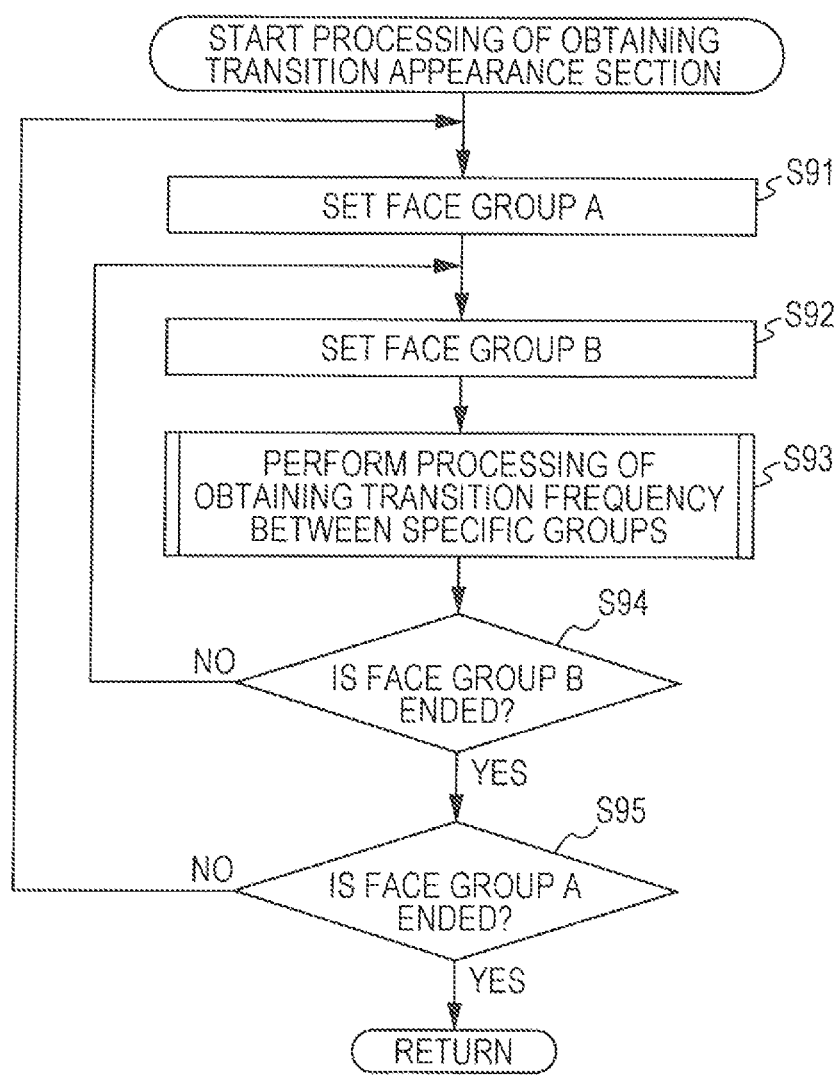
FIG. 8 is a flow chart illustrating a processing of obtaining a transition appearance section.

Next, the processing of obtaining the transition appearance section in step S54 of FIG. 6 will be described, with reference to a flowchart of FIG. 8.

In step S91, the transition appearance section obtaining unit 53 sets one group within the group of the face groups to a face group A.

In step S92, the transition appearance section obtaining unit 53 sets the face group other than the face group which is set to the face group A, to a face group B.

In step S93, the transition appearance section obtaining unit 53 performs a processing of obtaining a transition frequency between specific groups. The processing of obtaining the transition frequency between the specified groups will be described later, with reference to FIG. 9. According to the processing of step S93, the data of the correlation degree is obtained, based on the transition frequency between the face group A and the face group B.

In step S94, the transition appearance section obtaining unit 53 determines whether or not the processing of the face group B ends. In step S94, if it is determined that the processing of the face group B does not end, the processing returns to step S92, therefore, other face groups are set to the face group B, and the subsequent processing is repeated.

When the processing of setting all of the face groups other than the face group which is set to the face group A to the face group B ends, the processing proceeds to step S95.

In step S95, the transition appearance section obtaining unit 53 determines whether or not the processing of the face group A ends. In step S95, if it is determined that the processing of the face group A does not end, the processing returns to step S91, therefore, other face groups are set to the face group A, and the subsequent processing is repeated.

Figure 6:
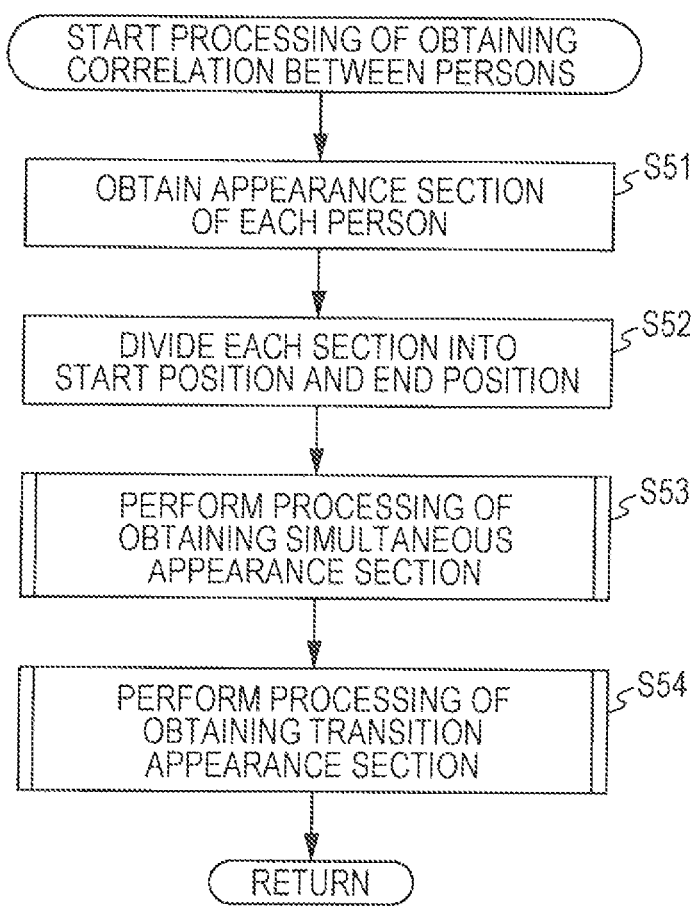
FIG. 6 is a flow chart illustrating a processing of obtaining the correlation degree between the persons.
Figure 7:
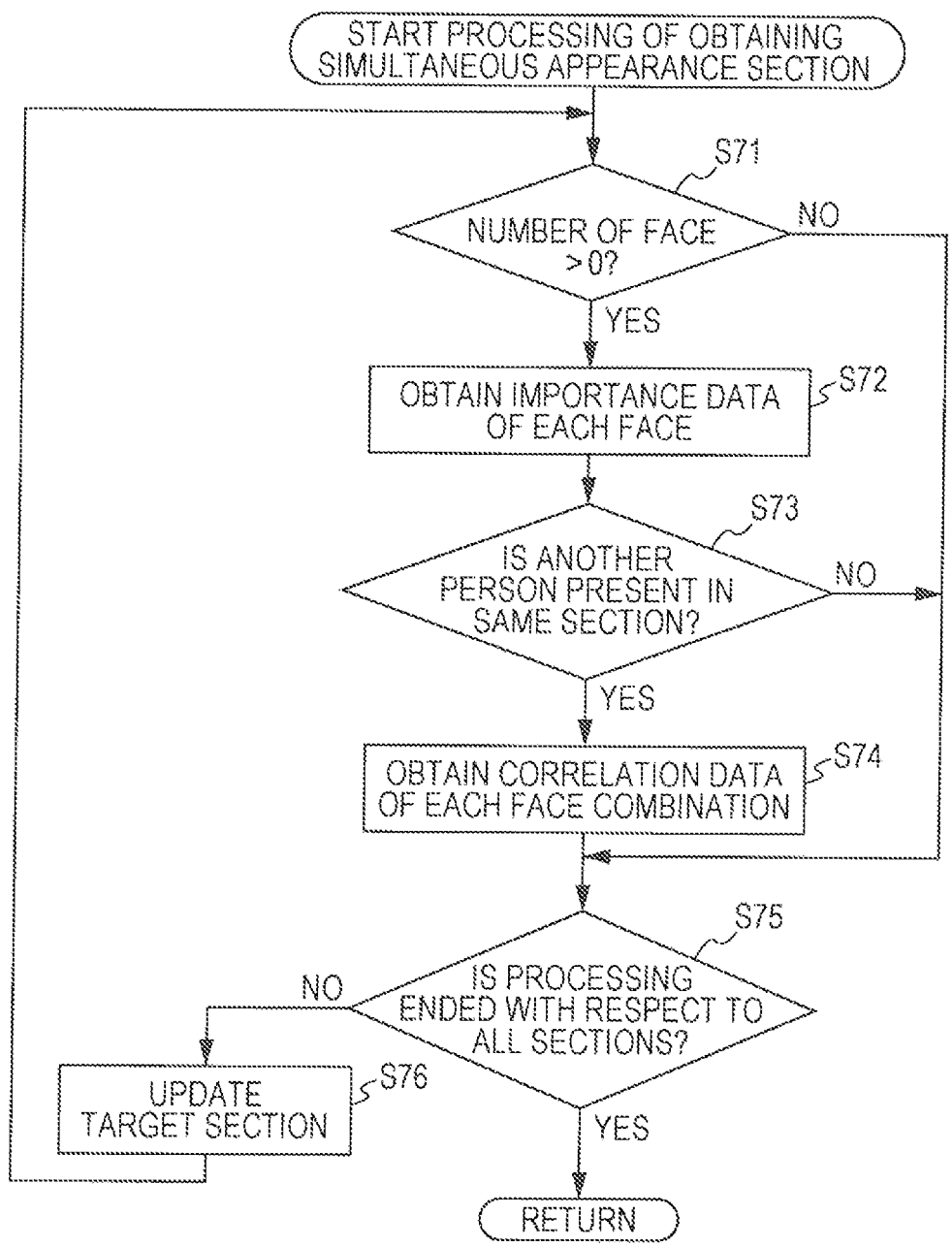
FIG. 7 is a flow chart illustrating a processing of obtaining a simultaneous appearance section.

When the processing of setting all of the face groups to the face group A ends, the processing of obtaining the transition appearance section ends, and the processing proceeds to step S54 of FIG. 6.

Example of Processing of Obtaining Transition Frequency

Figure 9:
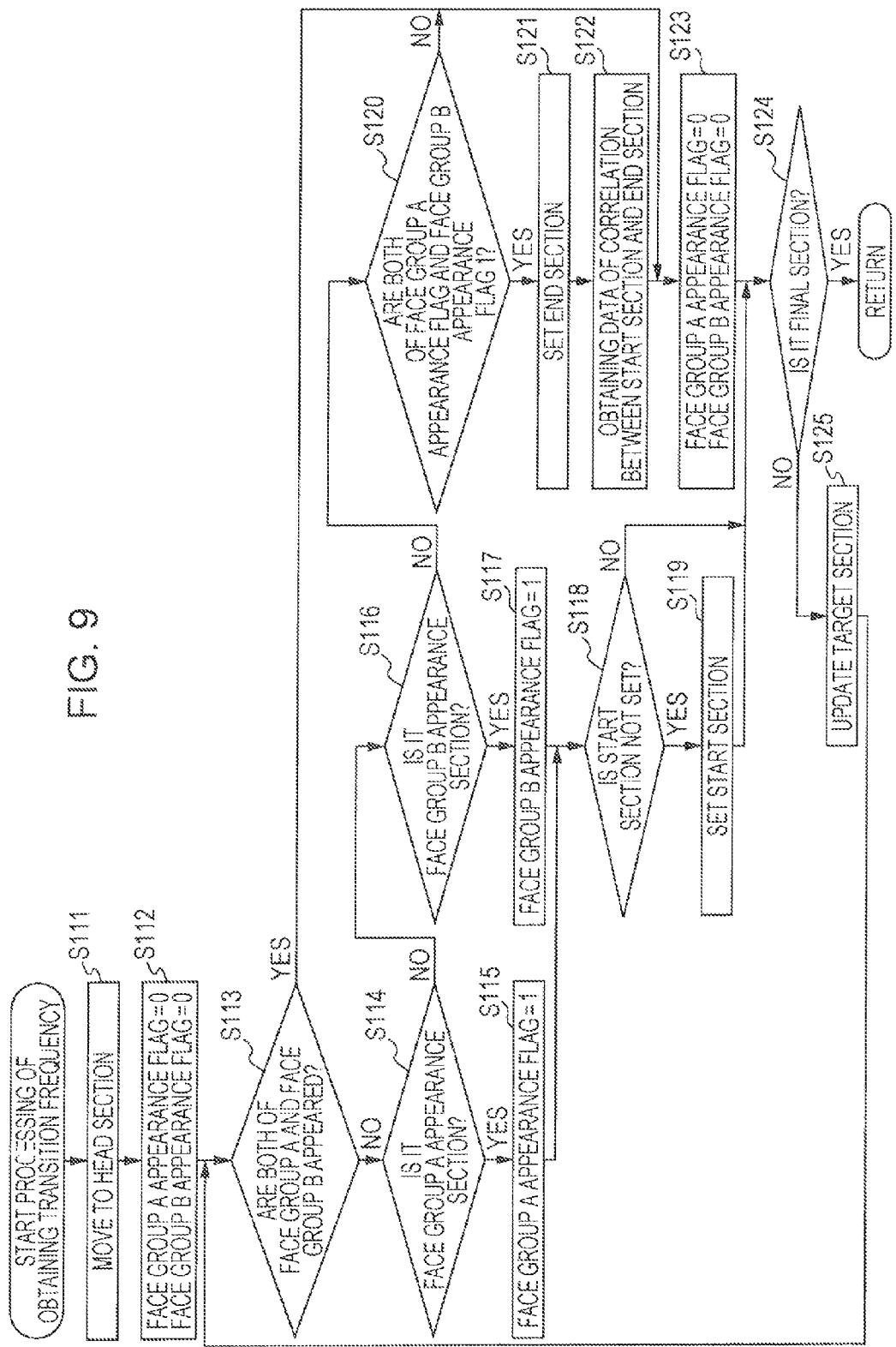
FIG. 9 is a flow chart illustrating a processing of obtaining a transition frequency.

Next, the processing of obtaining the transition frequency in step S93 of FIG. 8 will be described, with reference to a flowchart of FIG. 9.

In step S111, the transition appearance section obtaining unit 53 moves to the head section (for example, the section S0 of FIG. 5). In step S112, the transition appearance section obtaining unit 53 assumes a face group A appearance flag=0 and a face group B appearance flag=0.

In step S113, the transition appearance section obtaining unit 53 determines whether or not both of the face group A and the face group B appear in the target section. In step S113, if it is determined that both of the face group A and the face group B do not appear, the processing proceeds to step S114.

In step S114, the transition appearance section obtaining unit 53 determines whether or not the target section is the section where the face group A appears. In step S114, if it is determined that the target section is the section where the face group A appears, the processing proceeds to step S115. In step S115, the transition appearance section obtaining unit 53 assumes that the face group A appearance flag is 1.

In step S114, if it is determined that the target section is not the section where the face group A appears, the processing proceeds to step S116. In step S116, the transition appearance section obtaining unit 53 determines whether or not the target section is the section where the face group B appears. In step S116, if it is determined that the target section is the section where the face group B appears, the processing proceeds to step S117. In step S117, the transition appearance section obtaining unit 53 assumes that the face group B appearance flag is 1, and the processing proceeds to step S118.

In step S118, the transition appearance section obtaining unit 53 determines whether or not the start section is not set. In step S118, if it is determined that the start section is not set, the processing proceeds to step S119. In step S119, the transition appearance section obtaining unit 53 sets the start section. In other words, the target section is set as the start section, and the processing proceeds to step S124.

In step S118, if it is not determined that the start section is not set, that is, if it is determined that the start section is set, the processing proceeds to step S124.

In step S116, if it is determined that the target section is not the section where the face group B appears, the processing proceeds to step S120. In step S120, the transition appearance section obtaining unit 53 determines whether or not both of the face group A appearance flag and the face group B appearance flag are 1. In step S120, if it is determined that both of the face group A appearance flag and the face group B appearance flag are 1, the processing proceeds to step S121.

In step S121, the transition appearance section obtaining unit 53 sets the end section. In other words, the section which is next to before the target section is set as the end section.

In step S122, the transition appearance section obtaining unit 53 obtains the data of the correlation degree between the start section and the end section. That is, in step S122, as the data of the correlation degree between the persons relating to two persons, the average values of the length of the start section to the end section, the ratio of the sizes of the faces between both persons, the positional relationship of the faces between both persons and the number of persons who appear at the same time are respectively obtained, and the processing proceeds to step S123.

In step S120, when the transition appearance section obtaining unit 53 determines that both of the face group A appearance flag and the face group B appearance flag is not 1, the processing proceeds to step S123. In step S123, if the transition appearance section obtaining unit 53 assumes that both of the face group A appearance flag and the face group B appearance flag are 0, the processing proceeds to step S124.

In step S124, the transition appearance section obtaining unit 53 determines whether or not the target section is a final section of the video file. In step S124, if it is determined to be the final section, the processing of obtaining the transition frequency in FIG. 9 ends, the processing returns to step S93 of FIG. 8.

In step S124, if it is determined not to be the final section, the processing proceeds to step S125. In step S125, the transition appearance section obtaining unit 53 updates the target section, that is, moves the target section to the next section, the processing returns to step S113, and the subsequent processing is repeated.

In the manner described above, the data of the correlation degree is obtained from the frequency where plural persons appear by transiting in terms of time.

2. Embodiment

Display Example

Display Example of Diagram of Correlation Between Persons

Figure 10:
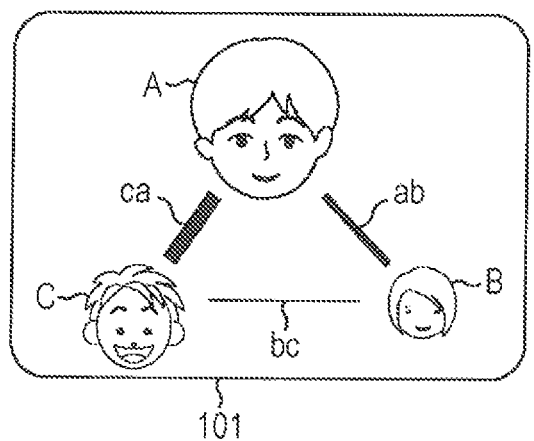
FIG. 10 is a diagram illustrating an example of a diagram of a correlation between the persons.

FIG. 10 is a diagram illustrating an example of the diagram of the correlation between the persons which is generated and displayed, based on the data of the correlation degree between the persons which is obtained as described above.

In the example of FIG. 10, a diagram of the correlation between the persons 101 is shown. In the diagram of the correlation between the persons 101, the face image A of the person a which is shown in FIG. 5, the face image B of the person b and the face images C of the person c are displayed. The face image A to the face image C are representative images of each face group which is obtained by the face grouping unit 22. In the example of FIG. 10, it is represented that the face image C is greater than the face image B, and is smaller than the face image A.

It is assumed that the sizes of the face image A to the face image C vary depending on the appearance frequency. That is, the sizes of the face image A to the face image C are determined, based on the data showing the importance degree of each person that is obtained by the simultaneous appearance section obtaining unit 52. For example, the sizes of the face image A to the face image C may be determined from the ratio of the appearance time of the target face with respect to the total length of the moving image, in addition to this, the size of the face at the time of appearing, the position of the face (how long is the location of the face in the center or the like) and the value corresponding to the number of persons who appear at the same time. Furthermore, the information such as orientation of the face at the time of appearing and the length of the talking time, may be also used.

Moreover, in the diagram of the correlation between the persons 101, line indicating the relationship between the persons (hereinbelow, referred to the line as link) ab, bc and ca are displayed between each face image of the face image A to the face image C. It is assumed that the widths of the links vary depending on the frequency of appearing at the same time. That is, the link ab that is displayed between the face image A and the face image B is represented by the average width of the link. The link bc that is displayed between the face image B and face image C is represented by the link of which the width is narrower than that of the link ab. The link ca that is displayed between the face image C and the face image A is represented by the link of which the width is wider than that of the link ab.

The thicknesses of the widths of the links are determined, based on the data of the correlation degree between the persons which is obtained by the simultaneous appearance section obtaining unit 52 and the transition appearance section obtaining unit 53. For example, the thicknesses of the widths of the lines may be determined from the ratio of the appearance time between the persons relating to two persons with respect to the total length of the moving image, in addition to this, the size of the face at the time of appearing, the position of the face and the value corresponding to the number of persons who appear at the same time.

By displaying the diagram of the correlation between the persons as described above, it is possible to grasp at a glance the relationship between the persons within the moving image, and the important person.

Another Display Example of Diagram of Correlation Between Persons

Figure 11:
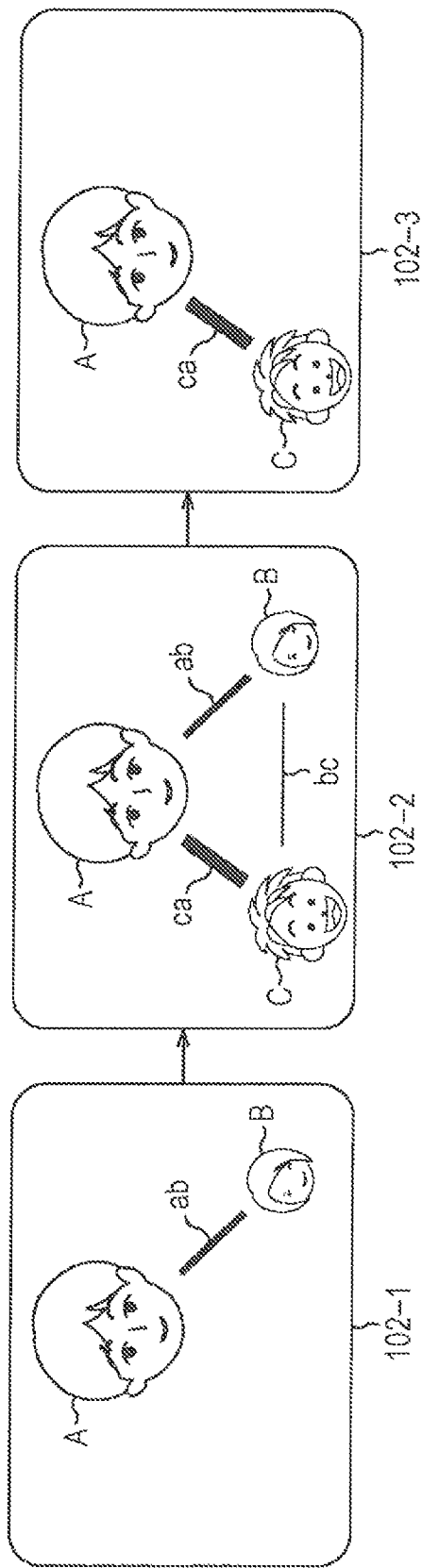
FIG. 11 is a diagram illustrating another example of the diagram of the correlation between the persons.

FIG. 11 is a diagram illustrating another example of the diagram of the correlation between the persons.

The diagram of the correlation between the persons 101 of FIG. 10 is displayed in such manner that the correlation between the persons within the moving image is represented by one, but a diagram of the correlation between the persons 102-1 to a diagram of the correlation between the persons 102-3 in FIG. 11, are displayed in such manner that the moving image is displayed in order to notice easily how the correlation between the persons varies along with the time transition within the moving image. In the diagram of the correlation between the persons 102-1 to the diagram of the correlation between the persons 102-3, the link ab, the link bc and the link ca are represented by the thicknesses which are described above with reference to FIG. 10, but the thicknesses of the links may be also changed by changing the correlation degree along with the time transition.

For example, as a representation of the correlation between the persons at a certain time, the diagram of the correlation between the persons 102-1 is displayed. Since only the person a and the persons b appear in the moving image, only the face image A corresponding to the person a, the face image B corresponding to the person b and the link ab showing the relationship thereof are displayed in the diagram of the correlation between the persons 102-1.

After only a predetermined time interval from the certain time, as the representation of the correlation between the persons at that time, the diagram of the correlation between the persons 102-1 transits to the diagram of the correlation between the persons 102-2. Since the person a to the person c appear within the moving image, the face image A corresponding to the person a, the face image B corresponding to the person b, the face image C corresponding to the person c, and the link ab, the link bc, and the link ca which show the relationship thereof, are displayed in the diagram of the correlation between the persons 102-2.

Furthermore, after two times of the predetermined time interval from the certain time, as the representation of the correlation between the persons at that time, the diagram of the correlation between the persons 102-2 transits to the diagram of the correlation between the persons 102-3. Since only the person a and the person c appear within the moving image, only the face image A corresponding to the person a, the face image C corresponding to the person c, and the link ca showing the relationship thereof are displayed in the diagram of the correlation between the person 102-3.

In this case, in the simultaneous appearance section obtaining unit 52 and the transition appearance section obtaining unit 53, the correlation degree between the persons may be obtained with each optional time interval.

Moreover, instead of the time transition within the moving image, for example, based on the shooting time of plural moving images which the user has, or the broadcasting time, it is possible to obtain the correlation degree between the persons per time. In this case, instead of obtaining the correlation degree between the persons of each moving image, it is assumed that one correlation degree between the persons is obtained from plural moving images.

By displaying the diagram of the correlation between the persons as described above, it is assumed to notice easily how the correlation between the persons varies along with time transition within the moving image.

Figure 12:
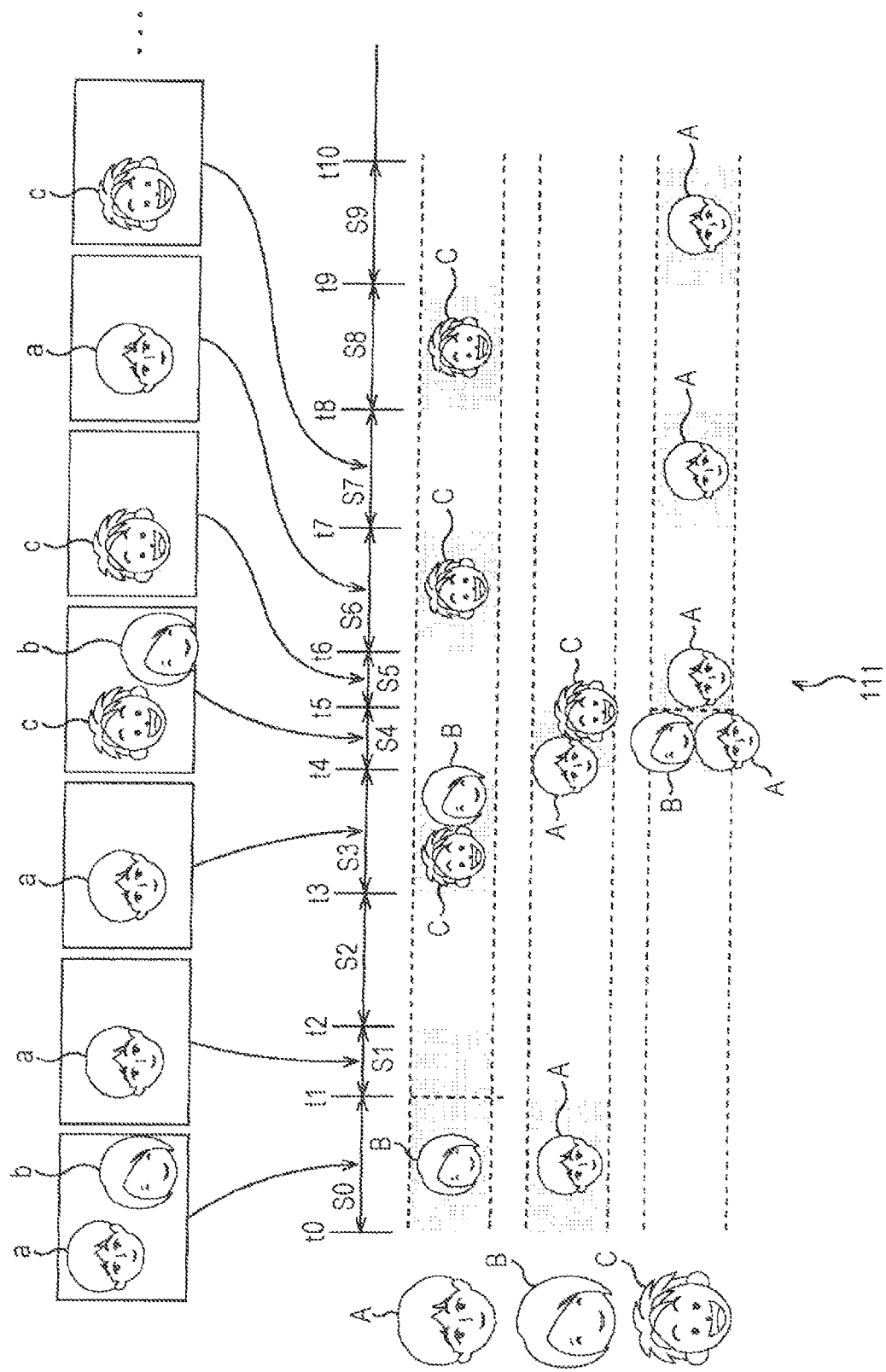
FIG. 12 is a diagram illustrating further another example of the diagram of the correlation between the persons.

In the example of FIG. 11, the example of displaying the time transition of the correlation between the persons in the moving image is described, but it is also possible to display the time transition of the correlation between the persons on a timeline, as shown in FIG. 12.

Another Display Example of Diagram of Correlation Between Persons

FIG. 12 is a diagram illustrating another example of the diagram of the correlation between the persons.

In the example of FIG. 12, a diagram of the correlation between the persons 111 of displaying the time transition of the correlation between the persons on the timeline, is shown. That is, in the diagram of the correlation between the persons 111 of FIG. 12, the appearance section of each person is marked (hatching) on the time line in the case to be described above with reference to FIG. 5, and the face image of the person who appears at the same time is displayed on the marking area (denoted with dots).

In the example of FIG. 12, not only the case of appearing in the screen at the same time (appearance), but also the case of appearing in the time transition are included, as the simultaneous appearance. As described above, when the case of appearing in the time transition is also included, the section thereof is displayed in the same manner of the section of appearing at the same time (appearance) in FIG. 12, but the simultaneous appearance section and the transition appearance section may be displayed by changing the color of the marking and the color of the face image, in order to improve visibility.

Specifically, in the diagram of the correlation between the persons 111, in order from top, the face image A corresponding to the person a is displayed on the left end, and the appearance section of the person a is displayed by marking (hatching) on the right side thereof. Next, the face image B corresponding to the person b is displayed on the left end, and the appearance section of the person b is displayed by marking (hatching) on the right side thereof. Finally, the face image C corresponding to the person c is displayed on the left end, and the appearance section of the person c is displayed by marking (hatching) on the right side thereof.

In the section S0 of timing t0 to t1, the person a and the person b appear at the same time, but there is no transition appearance in the front section and the back section thereof. Accordingly, in the section S0, the face image B of the person b is displayed on the hatching region showing the appearance section of the person a, and the face image A of the person a is displayed on the hatching region showing the appearance section of the person b.

In the section S1 of timing t1 to t2, only the person a appears, there is no transition appearance in the front section and the back section thereof. Therefore, in the section S1, only the hatching region showing the appearance section of the person a is displayed.

In the section S2 of timing t2 to t3, the person does not appear, and there is no transition appearance in the front section and the back section thereof. Accordingly, in the section S2, nothing is displayed.

In the section S3 of timing t3 to t4, only the person a appears, but there is the transition appearance of the person b and the person c in the back section thereof. Therefore, in the section S3, the face image B of the person b and the face image C of the person c are displayed on the hatching region showing the appearance section of the person a.

In the section S4 of timing t4 to t5, the person b and the person c appear, but there is the transition appearance of the person a in the front section thereof. Accordingly, in the section S4, the face image A of the person a (transition) and the face image C of the person c (at the same time) are displayed on the hatching region showing the appearance section of the person b. Moreover, in the section S4, the face image A of the person a (transition) and the face image B of the person b (at the same time) are displayed on the hatching region showing the appearance section of the person c.

In the section S5 of timing t5 to t6, the person c appears, but there is the transition appearance of the person a in the back section thereof. Therefore, in the section S5, the face image A of the person a (transition) is displayed on the hatching region showing the appearance section of the person c.

In the section S6 of timing t6 to t7, the person a appears, but there is the transition appearance of the person c in the front section and the back section thereof. Accordingly, in the section S6, the face image C of the person c (transition) is displayed on the hatching region showing the appearance section of the person a.

In the section S7 of timing t7 to t8, the person c appears, but there is the transition appearance of the person a in the front section and the back section thereof. Therefore, in the section S7, the face image A of the person a (transition) is displayed on the hatching region showing the appearance section of the person c.

In the section S8 of timing t8 to t9, the person a appears, but there is the transition appearance of the person c in the front section and the back section thereof. Accordingly, in the section S8, the face image C of the person c (transition) is displayed on the hatching region showing the appearance section of the person a.

In the section S9 of timing t9 to t10, the person c appears, but there is the transition appearance of the person a in the front section and the back section thereof. Therefore, in the section S9, the face image A of the person a (transition) is displayed on the hatching region showing the appearance section of the person c.

As described above, not only the time transition of the correlation between the persons is displayed on the timeline, but the appearance section of each person is marked on the timeline, and furthermore, it is possible to facilitate to understand who is reflected together by displaying the face image of the person to appear at the same time.

Another Display Example of Diagram of Correlation Between Persons

Figure 13:
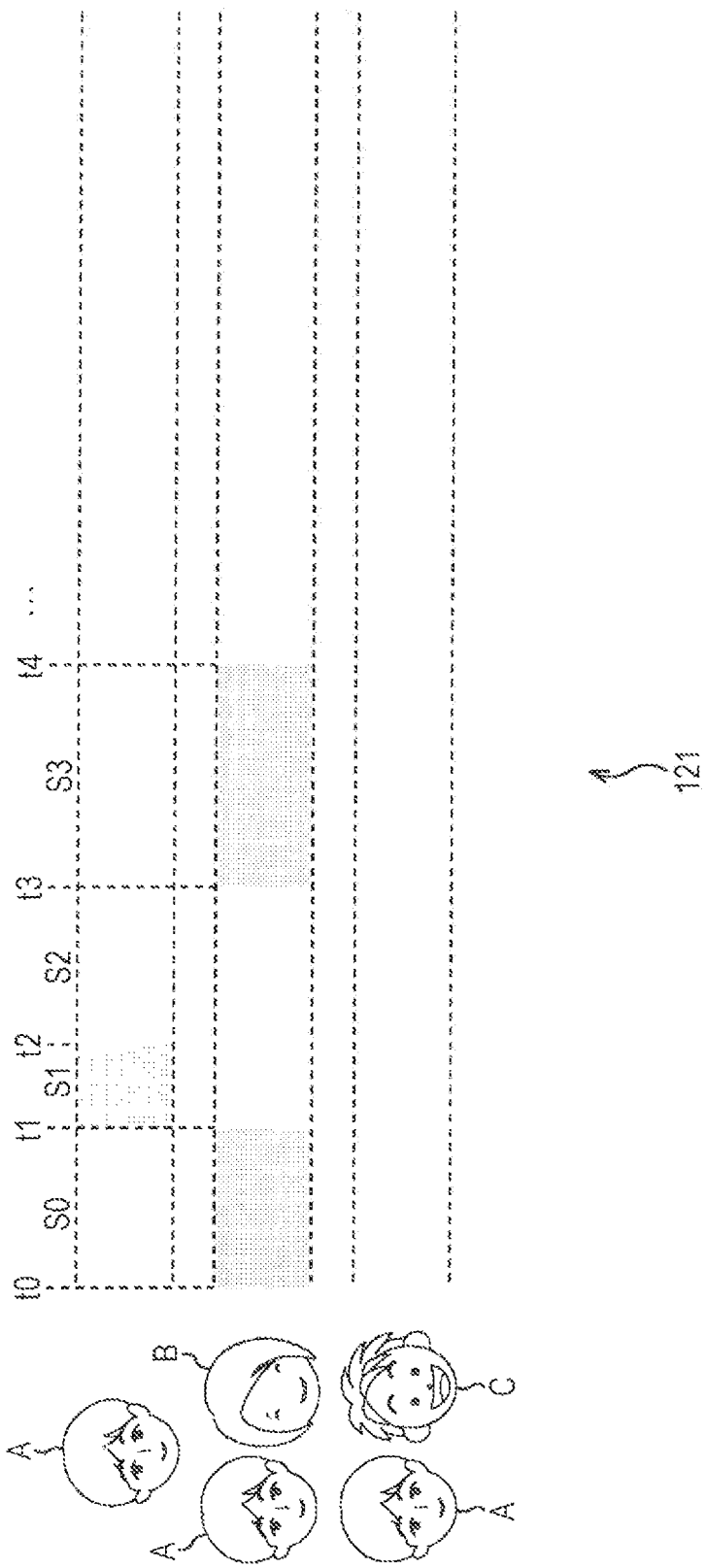
FIG. 13 is a diagram illustrating another example of the diagram of the correlation between the persons.

FIG. 13 is a diagram illustrating further another example of the diagram of the correlation between the persons.

In the example of FIG. 13, a diagram of the correlation between the persons 121 where the time transition of the correlation between the persons is displayed on the timeline, is shown. That is, in the diagram of the correlation between the persons 121 of FIG. 13, the appearance section of each person and each combination of the persons in the case which is described above with reference to FIG. 5, is displayed by marking on the timeline.

Specifically, in the diagram of the correlation between the persons 121, in order from the top, the face image A of the person a is displayed on the left end, and the appearance section of the person a is displayed by marking (hatching) on the right side thereof. Next, the face image A of the person a and the face image B of the person b are displayed on the left end, and the appearance section of the combinations of the person a and the person b is displayed by marking (hatching) on the right side thereof. Finally, the face image A of the person a and the face image C of the person c are displayed on the left end, the appearance section of the combination of the person a and the person c is displayed by marking (hatching) on the right side thereof.

In the section S0 of timing t0 to t1 and the section S3 of timing t3 to t4, since the person a and the person b appear at the same time, the section S0 and the section S4 in the right side of the face image A of the person a and the face image B of the person b are hatched. In the section S1 of timing t1 to t2, since only the person a appears, the section S1 in the right side of the face image A of the person a is hatched.

However, in the case of the example in FIG. 13, since the person a and the person c do not appear at the same time on the time line which is shown in FIG. 5, any section in the right side of the face image A of the person a and the face image C of the person c is not hatched.

As described above, since not only the timeline of each person but also the timeline of each combination of the persons are prepared, it is facilitate to grasp the correlation between the persons by marking the time band of appearing with the combination.

In addition, as another examples of the diagram of the correlation between the persons, for example, by dividing the specific person by year, it is possible to use the diagram of the correlation between the persons per year. Therefore, it is possible to provide the diagram of the correlation between the persons which tends to recognize the relationship of the persons that varies along with the elapse of time.

Moreover, while the height of the timeline varies depending on the number of faces to appear, it is possible to display the face image of the person who appears at the same time in the time band.

3. Embodiment

Modification Example

Digest Generation, Cut Function

For example, in the diagram of the correlation between the persons 101 which is displayed on the display unit 27, the user selects one of the face image A to the face image C by operating the operation input unit 26. According to the selection, the digest generating unit 29 generates the digest which is formed by only the scene where only the selected person appears, and may perform the reproduction.

Alternatively, in the diagram of the correlation between the persons 101, the user selects one of the links ab, bc and ca indicating the relationship between each of the face image A to the face image C, by operating the operation input unit 26. According to the selection, the digest generating unit 29 generates the digest which is formed by only the scene where only the plural persons appear, the scene is shown by the selected link, and may perform the reproduction.

In the same manner of generating the digest as described above, the cut point is put into the scene by the selected person or only the plural persons, and it is also possible to form in order to be easy in the reutilization such as an editing.

Figure 14:
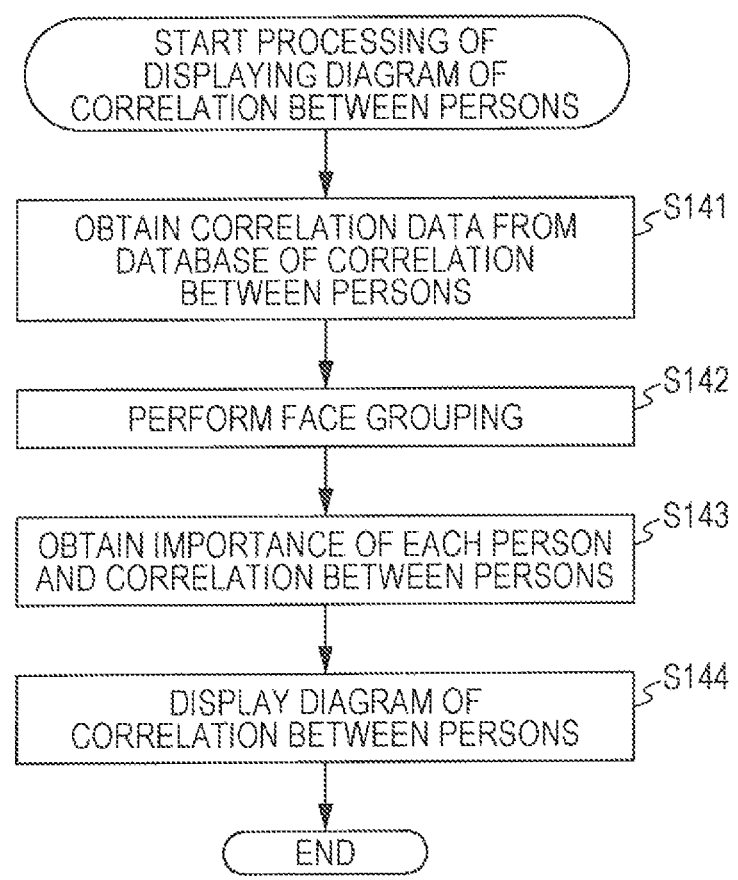
FIG. 14 is a flow chart illustrating a processing of displaying the diagram of the correlation between the persons.

Processing of Displaying Diagram of Correlation Between Persons in Video Contents Search Next, the processing of displaying the diagram of the correlation between the persons will be described in the video contents search of the information processing apparatus 11, with reference to a flowchart of FIG. 14. In the example of FIG. 14, when the video contents search is performed with the personal name as a key, the personal name is input, and an example of displaying the diagram of the correlation between the persons centering around the person will be described.

For example, the personal name is input by the operation input unit 26 which is operated by the user. The input personal name is supplied to the search unit 28 via the display control unit 25. In response to this, in step S142, the search unit 28 obtains the data of the correlation degree from the database of the correlation degree between the persons 24. Here, the range to obtain the data of the correlation degree may be all the moving images which the user has, or it is also possible to be limited to the shooting time and the shooting location.

In step S142, the search unit 28 performs the face grouping using the face image feature amounts of all the persons which are written in the total data of the correlation degree. In step S143, the importance degree of each person and the correlation degree between the persons are obtained. The search unit 28 supplies the obtained importance degree of each person and the obtained correlation degree between the persons to the display control unit 25.

In step S144, the display control unit 25 generates the diagram of the correlation between the persons centering around the input personal name (person) as a key, based on the obtained importance degree of each person and the obtained correlation degree between the persons, and displays the generated diagram of the correlation between the persons on the display unit 27.

Since it is not necessary to perform the processing described above whenever the personal name is input, the processing is performed in advance, and it is possible to use the result thereof.

Moreover, in the diagram of the correlation between the persons which is displayed as described above, the person is selected, and it is possible to search for the scene where the person appears alone. In the diagram of the correlation between the persons, the links showing the relationship between the persons or the plural face images are selected, and it is possible to search for the scene where the persons on both ends of the link or the selected plural persons appear together. According to this, it is possible to facilitate a refinement of the search.

Furthermore, in the example of FIG. 14, an example of inputting the personal name as a key is described, but instead of this, the search may be performed with the diagram of the correlation between the persons that is generated by the user as a key. That is, the information processing apparatus 11 may be configured to set the selection of the face image in the diagram of the correlation between the persons, the size of each selected face, and the width of the link showing the relationship between the persons. Therefore, the similar contents may be searched for by converting the size of each set face and the width of the link in the diagram of the correlation between the persons which is generated by the user, into the importance degree of each person and the correlation degree of between each persons.

When the search with the personal name as a key is performed in the video contents, the result thereof may be shown depending on the importance degree of the person within the video. In the case of being the plural personal names as a key, the result thereof may be shown in descending order of the importance degree of each person and the correlation degree between the persons.

Configuration Example in Case of being Used to Personal Identification

Figure 15:
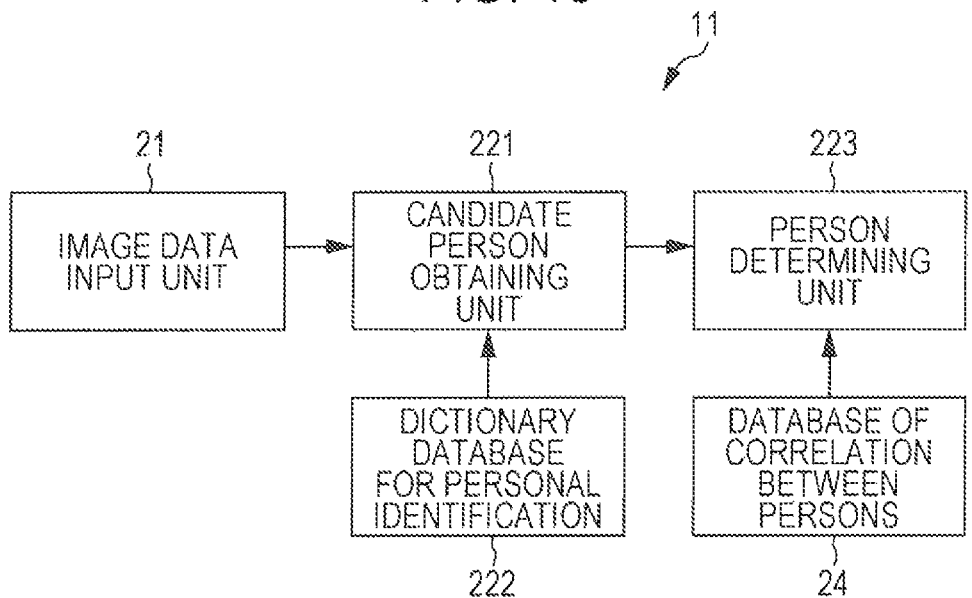
FIG. 15 is a block diagram illustrating another configuration example of the information processing apparatus to which the present technology is applied.

It is also possible to use the correlation degree between the persons that is registered in the database of the correlation degree between the persons 24, to the personal identification. FIG. 15 is a diagram illustrating a configuration example of the information processing apparatus 11 in this case.

In the example of FIG. 15, the information processing apparatus 11 is configured to include the image data input unit 21, the database of the correlation degree between the persons 24, a candidate obtaining unit 221, a dictionary database for personal identification 222 and a person determining unit 223.

The information processing apparatus 11 is configured to have the image data input unit 21 and the database of the correlation degree between the persons 24, in common with the information processing apparatus 11 of FIG. 1. The configuration of the information processing apparatus 11 where the face grouping unit 22, the correlation degree between persons obtaining unit 23, the display control unit 25, the operation input unit 26 and the display unit 27 are removed, is different from that of the information processing apparatus 11 of FIG. 1. The configuration of the information processing apparatus 11 where the candidate obtaining unit 221, the dictionary database for personal identification 222 and the person determining unit 223 are added, is different from that of the information processing apparatus 11 of FIG. 1.

In other words, the image data input unit 21 supplies the input image data to the candidate obtaining unit 221. The candidate obtaining unit 221 obtains the list of the person having a high similarity degree within the dictionary database for personal identification 222, with each person within the image, and supplies the obtained list to the person determining unit 223.

In the dictionary database for personal identification 222, a set of the plural personal names and the face image feature amounts is registered for the personal identification.

The person determining unit 223 determines the person, using the list from the candidate obtaining unit 221, and the correlation degree from the database of the correlation degree between the persons 24.

Example of Processing of Personal Identification

Figure 16:
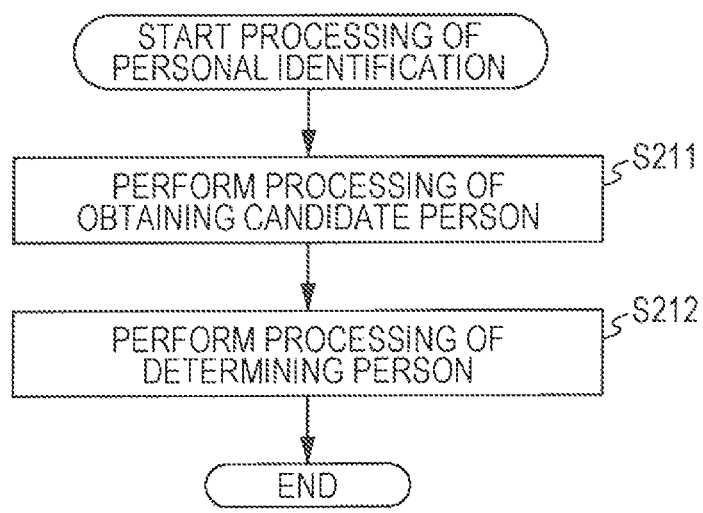
FIG. 16 is a flow chart illustrating a processing of a personal identification.

Next, the processing of the personal identification will be described with reference to a flowchart of FIG. 16. For example, the image data which is input by the image data input unit 21, is supplied to the candidate obtaining unit 221, and the processing of the personal identification starts.

In step S211, the candidate obtaining unit 221 performs the processing of obtaining the candidate. That is, the candidate obtaining unit 221 detects all faces that appear within the specific frame of the image, and performs the processing of specifying the person, using the dictionary database for personal identification 222 with respect to each of the detected faces. The candidate obtaining unit 221 evaluates the similarity degree with the face image feature amounts of all persons within the dictionary database for personal identification 222, with respect to each face within the input image, and adds to the list as the candidate of each face when the similarity degree is greater than the threshold. The candidate obtaining unit 221 supplies the obtained list to the person determining unit 223.

In step S212, the person determining unit 223 performs the processing of determining each person, based on the list of each face that is obtained by the candidate obtaining unit 221. The processing will be described with reference to FIG. 17.

In the example of FIG. 17, an example of a case where two faces appear in the screen is shown.

The list showing that the candidate of a face (image) A is two persons of a person 1 and a person 5, and the list showing that the candidate of a face (image) B is three persons of a person 3, a person 2 and a person 6, are obtained by the candidate obtaining unit 221.

The person determining unit 223 obtains the correlation degree between the candidates with each of the face A and the face B from the database of the correlation degree between the persons 24. At this time, it is preferable that the obtained correlation degree is the value which is obtained by the simultaneous appearance section obtaining unit 52.

In the example of FIG. 17, when the face A is the person 1 and the face B is the person 3, the correlation degree between the candidates is 0.1, and when the face A is the person 5 and the face B is the person 3, the correlation degree between the candidates is 0.0. When the face A is the person 1 and the face B is the person 2, the correlation degree between the candidates is 0.2, and when the face A is the person 5 and the face B is the person 2, the correlation degree between the candidates is 0.0. The correlation degree between the candidates is 0.8 when the face A is the person 1 and the face B is the person 6, and the correlation degree between the candidates is 0.3 when the face A is the person 5 and the face B is the person 6.

In this case, since the combination of the person 1 and the person 6 has the highest correlation degree, the person determining unit 223 determines that the face A is the person 1 and the face B is the person 6. Thus, the person determining unit 223 determines the final person by selecting the combination having the highest correlation degree from each of the combinations.

In addition, as shown in FIG. 18, the determination of the combination may use the value obtained by multiplying the similarity degree of each person to the correlation degree of each combination.

In the example of FIG. 18, when the face A is the person 1 and the face B is the person 3, the correlation degree between the candidates is 0.1, the similarity degree of the person 1 is 0.9, and the similarity degree of the person 3 is 0.7. Therefore, when the face A is the person 1 and the face B is the person 3, the evaluation value thereof becomes 0.063 of the value which is obtained by multiplying 0.9 and 0.7 to 0.1. When the face A is the person 5 and the face B is the person 3, the correlation degree between the candidates is 0.1, the similarity degree of the person 5 is 0.6, and the similarity degree of the person 3 is 0.7. Accordingly, when the face A is the person 1 and the face B is the person 3, the evaluation value thereof becomes 0.0 of the value which is obtained by multiplying 0.7 and 0.6 to 0.0.

When the face A is the person 1 and the face B is the person 2, the correlation degree between the candidates is 0.2, the similarity degree of the person 1 is 0.9, and the similarity degree of the person 2 is 0.6. Therefore, when the face A is the person 1 and the face B is the person 2, the evaluation value thereof becomes 0.108 of the value which is obtained by multiplying 0.9 and 0.6 to 0.2. When the face A is the person 5 and the face B is the person 2, the correlation degree between the candidates is 0.0, the similarity degree of the person 5 is 0.6, and the similarity degree of the person 2 is 0.6. Accordingly, when the face A is the person 5 and the face B is the person 2, the evaluation value thereof becomes 0.0 of the value which is obtained by multiplying 0.6 and 0.6 to 0.0.

When the face A is the person 1 and the face B is the person 6, the correlation degree between the candidates is 0.8, the similarity degree of the person 1 is 0.9, and the similarity degree of the person 6 is 0.5. Therefore, when the face A is the person 1 and the face B is the person 6, the evaluation value thereof becomes 0.36 of the value which is obtained by multiplying 0.9 and 0.5 to 0.8. When the face A is the person 5 and the face B is the person 6, the correlation degree between the candidates is 0.3, the similarity degree of the person 5 is 0.6, and the similarity degree of the person 6 is 0.5. Accordingly, when the face A is the person 5 and the face B is the person 6, the evaluation value thereof becomes 0.09 of the value which is obtained by multiplying 0.6 and 0.5 to 0.3.

According to this, the person determining unit 223 determines by obtaining the evaluation values thereof with respect to all combinations and selecting the combination having the highest evaluation value. In the case of the example in FIG. 18, if the combination of the person 1 and the person 6 has the highest evaluation value, the person determining unit 223 determines that the face A is the person 1 and the face B is the person 6.

In the example of FIG. 18, an example of multiplying the similarity degree to the correlation degree is described, but if the evaluation value is obtained by combining the similarity degree with the correlation degree, the calculation of the combination is not limited to the multiplication.

As described above, since the person that is most similar is assigned by using the correlation degree to the personal identification, in comparison with the related art where a mistake occurs by a coincidence, it is possible to improve the performance of the personal identification.

As described above, according to the present technology, even when plural persons alternately appear in terms of time by individually shooting with plural cameras without appearing at the same time in the screen, it is possible to properly obtain the correlation degree between the persons. Additionally, it is assumed that the diagram of the correlation between the persons which is generated based on it represents the correlation degree between the persons in the contents, more accurately. Therefore, it is possible to facilitate the understanding of the content of the contents.

For example, in Japanese Unexamined Patent Application Publication No. 2007-281680, it is disclosed that the display for easily noticing the face of the person who appears in the moving image and the appearance section is described, but in the technology, only the appearance section of each person is easily noticed. In contrast, according to the present technology, the diagram of the correlation between the persons is displayed, and it is possible to easily understand the relationship between the persons.

According to the present technology, it is possible to display the diagram of the correlation between the persons centering around the specific person at each of the time band within one moving image and the shooting time of plural moving images, therefore, it is possible to easily understand the personal relationship to vary along with the time transition.

Furthermore, according to the present technology, it is possible to improve the operability by using the diagram of the correlation between the persons as the aid of a key input at the time of searching video. It is possible to improve the accuracy of the search by controlling the display order of the search result, using the correlation between the persons.

According to the present technology, by using the information of the correlation between the persons to the personal identification, it is possible to improve the performance of the personal identification.

The series of the processings described above can be executed by hardware, and can be executed by software. If the series of the processings are executed by software, the program that forms the software is installed in the computer. Here, in the computer, by installing the computer that is built in dedicated hardware and various programs, it is possible to execute various functions, for example, a general-purpose personal computer is included.

Configuration Example of Computer

Figure 19:
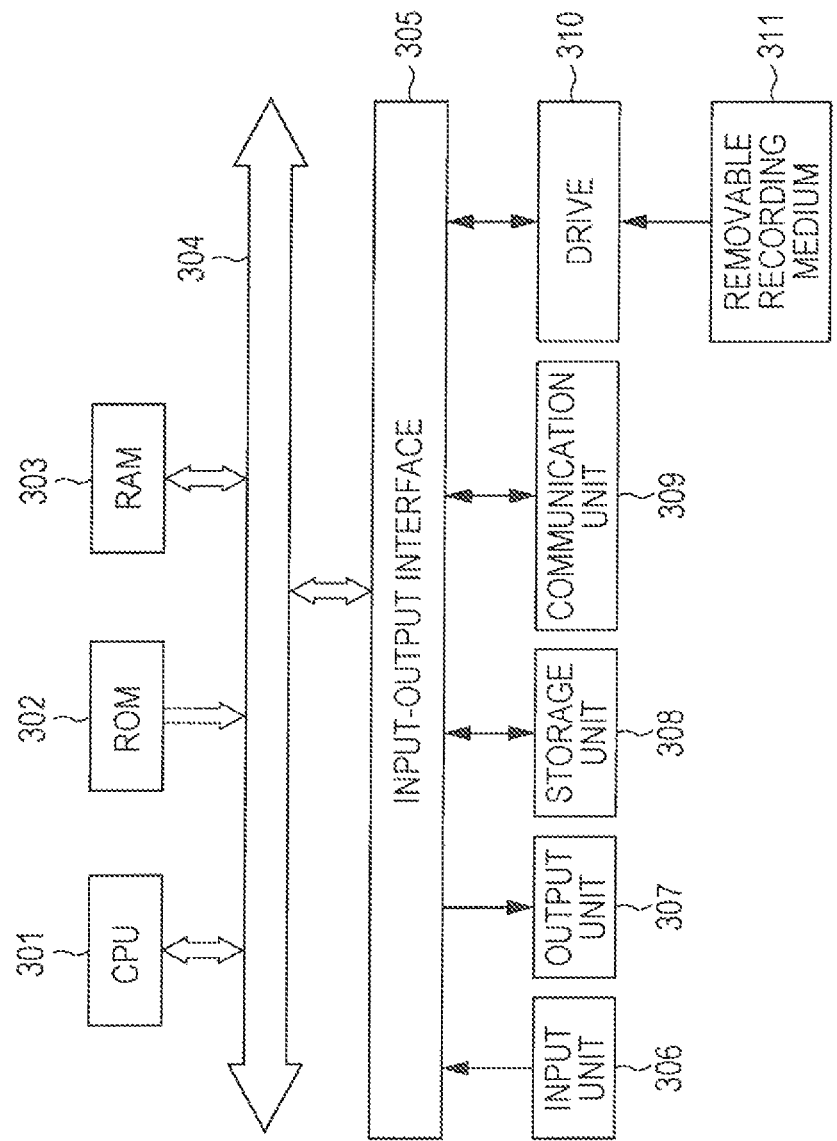
FIG. 19 is a block diagram illustrating a configuration example of a computer.

FIG. 19 shows a configuration example of hardware of the computer that executes the series of the processings described above by the program.

In a computer 300, a CPU (Central Processing Unit) 301, a ROM (Read Only Memory) 302, and a RAM (Random Access Memory) 303 are connected to each other via a bus 304.

Furthermore, the bus 304 is connected to an input-output interface 305. The input-output interface 305 is connected to an input unit 306, an output unit 307, a storage unit 308, a communication unit 309, and a drive 310.

The input unit 306 is formed by a keyboard, a mouse, and a microphone. The output unit 307 is formed by a display and a speaker. The storage unit 308 is formed by a hard disk and a non-volatile memory. The communication unit 309 is formed by a network interface. The drive 310 drives a removable recording medium 311 such as a magnetic disk, an optical disk, a magneto-optical disk and a semiconductor memory.

In the computer configured to be described above, for example, the CPU 301 executes a program which is stored in the storage unit 308 by loading the program on the RAM 303 via the input-output interface 305 and the bus 304, and the series of the processings described above is performed.

For example, the program which is executed by the computer (CPU 301) can be provided by being recorded on the removable recording medium 311 such as a package medium. In addition, the program may be provided via a wired or wireless transmission medium such as a local area network, the Internet and the digital satellite broadcasting.

In the computer, the program can be installed in the storage unit 308 via the input-output interface 305, by mounting the removable recording medium 311 on the drive 310. Furthermore, the program can be received by the communication unit 309 and installed in the storage unit 308, via the wired or wireless transmission medium. Alternatively, the program may be installed in the ROM 302 and the storage unit 308, in advance.

The program that is executed by the computer may be a program which performs the processing in time series according to the order which is described in the present specification, and the program may be a program which performs the processing in parallel or at necessary timing such as the case of performing a call.

In the present specification, the steps in which the series of processings described above are written may include the processing to perform in time series according to the written order, and even if the processing does not necessarily perform in time series, the steps may include the processings to be executed in parallel or individually.

Furthermore, the embodiments according to the present disclosure is not limited to the embodiments described above, and various modifications are possible within the scope without departing from the gist of the present disclosure.

For example, the present technology can take the configuration of cloud computing that shares one function with plural apparatuses via the network and handles jointly.

Moreover, each of the steps which are described in the flowcharts described above are executed with one apparatus, in addition, it is possible to execute by sharing with plural apparatuses.

Furthermore, when plural processings are included in one step, the plural processings are included in the one step are executed with one apparatus, in addition, it is possible to execute by sharing with plural apparatuses.

Moreover, in the above, it may be configured as plural apparatuses (or processing units) by dividing the configuration to be described as one apparatus (or processing unit). On the other hand, in the above, it may be configured as one apparatus (or processing unit) by arranging collectively the configuration to be described as plural apparatuses (or processing units). The configuration other than the configuration described above may add to the configuration of each apparatus (or each processing unit). Furthermore, if the configuration of the entire system and the operation are substantially the same, a part of the configuration of the apparatus (or processing unit) may be included in the configuration of other apparatus (or other processing unit). In other words, the present technology is not limited to the embodiments described above, and various modifications are possible within the scope without departing from the gist of the present technology.

Hereinabove, suitable embodiments according to the present disclosure are described in detail with reference to the accompanying drawings, but the disclosure is not limited thereto. According to those skilled in the field of the technology which belongs to the present disclosure, it is apparent to be understood various modification examples or revision examples within the scope of the technical idea which is written in the claims, and it is understood that the examples belong to the technical scope of the present disclosure.

In addition, the present technology can take the configuration as follows.

(1) An information processing apparatus including: a grouping unit that detects a part of an object from contents and performs grouping of each object; a correlation degree calculating unit that calculates a correlation degree between the objects of which the grouping is performed by the grouping unit; and a display control unit that controls a display of a diagram of a correlation between the objects indicating the correlation between the objects, based on the correlation degree between the objects which is calculated by the correlation degree calculating unit.

(2) The information processing apparatus according to the above (1), in which the correlation degree calculating unit includes an appearance section obtaining unit that obtains an appearance section of each object, a simultaneous appearance correlation degree calculating unit that calculates the correlation degree from a frequency where a plurality of objects appear at the same time, based on the appearance section of each object which is obtained by the appearance section obtaining unit, and a transition appearance correlation degree calculating unit that calculates the correlation degree from a frequency where the plurality of objects appear by transiting in terms of time, based on the appearance section of each object which is obtained by the appearance section obtaining unit.

(3) The information processing apparatus according to the above (1) or (2), in which the display control unit controls the display of a width of a link showing a relationship degree between the objects in the diagram of the correlation between the objects, based on the correlation degree between the objects which is calculated by the simultaneous appearance correlation degree calculating unit and the transition appearance correlation degree calculating unit.

(4) The information processing apparatus according to any one of the above (1) to (3), in which the simultaneous appearance correlation degree calculating unit calculates an importance degree of each object, based on the appearance section of each object which is obtained by the appearance section obtaining unit, and the display control unit controls the display of a size of an object image showing the object in the diagram of the correlation between the objects, based on the importance degree of each object which is calculated by the simultaneous appearance correlation degree calculating unit.

(5) The information processing apparatus according to the above (1) or (2), in which the display control unit controls a moving image display in the diagram of the correlation between the objects, based on the correlation degree between the objects which is calculated at each predetermined time interval by the simultaneous appearance correlation degree calculating unit and the transition appearance correlation degree calculating unit.

(6) The information processing apparatus according to the above (1) or (2), in which the display control unit controls a display on a timeline in the diagram of the correlation between the objects, based on the correlation degree between the objects which is calculated at each predetermined time interval by the simultaneous appearance correlation degree calculating unit and the transition appearance correlation degree calculating unit.

(7) The information processing apparatus according to any one of the above (1) to (6), further including: a digest generating unit that generates a digest of the contents to be configured by a scene where the plurality of objects which are connected with the selected object image or the selected link appear, depending on selection of the object image or the link showing the relationship degree between the objects, in the diagram of the correlation between the objects of which the display is controlled by the display control unit.

(8) The information processing apparatus according to any one of the above (1) or (6), further including: a cut point inserting unit that inserts a cut point into the scene where the plurality of objects which are connected with the selected object image or the selected link appear, depending on the selection of the object image or the link showing the relationship degree between the objects, in the diagram of the correlation between the objects of which the display is controlled by the display control unit.

(9) The information processing apparatus according to any one of the above (1) to (8), further including: a database of the correlation degree between persons that stores the correlation degree between the objects which is calculated by the simultaneous appearance correlation degree calculating unit and the transition appearance correlation degree calculating unit.

(10) The information processing apparatus according to the above (9), further including: an input unit that inputs an object name; and a search unit that searches for the correlation degree of the object corresponding to the object name which is input by the input unit, from the database of the correlation degree between the persons, in which the display control unit controls the display of the diagram of the correlation between the objects centering around the object which is searched for by the search unit.

(11) The information processing apparatus according to the above (9), further including: an input unit that inputs a setting of the diagram of the correlation between the objects; and a search unit that searches for the correlation degree of the object corresponding to the setting of the diagram of the correlation between the objects which is input by the input unit, from the database of the correlation degree between the persons.

(12) The information processing apparatus according to the above (9), further including: a candidate obtaining unit that obtains a candidate list by detecting all faces that appear in the image and adding a person having a large similarity degree with respect to the detected face, using the database of the correlation degree between the persons; and a person determining unit that determines the person, using the candidate list which is obtained by the candidate obtaining unit.

(13) The information processing apparatus according to the above (12), in which the person determining unit determines the person, taking the correlation degree of the candidate list which is obtained by the candidate obtaining unit as an evaluation value.

(14) The information processing apparatus according to the above (12), in which the person determining unit determines the person, taking a value which is obtained by the combination of the correlation degree of the candidate list which is obtained by the candidate obtaining unit and the similarity degree of each person as an evaluation value.

(15) The information processing apparatus according to any one of the above (1) to (14), in which the part of the object is a face image, and the object is a person.

(16) An information processing method including: by an information processing apparatus; detecting a part of an object from contents and performing grouping of each object; calculating a correlation degree between the objects of which the grouping is performed; and controlling a display of a diagram of a correlation between the objects indicating the correlation between the objects, based on the correlation degree between the objects which is calculated.

(17) A program causing a computer to function as: a grouping unit that detects a part of an object from contents and performs grouping of each object; a correlation degree calculating unit that calculates a correlation degree between the objects of which the grouping is performed by the grouping unit; and a display control unit that controls a display of a diagram of a correlation between the objects indicating the correlation between the objects, based on the correlation degree between the objects which is calculated by the correlation degree calculating unit.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a computer including circuitry configured as a grouping unit that detects a part of an object from contents and performs grouping for each object based on each time the object appears in the content;
a correlation degree calculating unit that calculates a correlation degree in time between all of the objects of which the grouping is performed by the grouping unit, the correlation degree including correlation between plural objects which alternately appear in time in the content without appearing at a same time in the content; and
a display control unit that controls a display of a diagram of a correlation between the objects indicating the correlation in time between appearance of the objects in the content, based on the correlation degree between the objects which is calculated by the correlation degree calculating unit, wherein the correlation degree calculating unit includes an appearance section obtaining unit that obtains an appearance section of each object, a simultaneous appearance correlation degree calculating unit that calculates the correlation degree from a frequency where a plurality of objects appear at the same time, based on the appearance section of each object which is obtained by the appearance section obtaining unit and a transition appearance correlation degree calculating unit that calculates the correlation degree from a frequency where the plurality of objects appear by transiting in terms of time, based on the appearance section of each object which is obtained by the appearance section obtaining unit.

2. The information processing apparatus according to claim 1, wherein the display control unit controls the display of a width of a link showing a relationship degree between the objects in the diagram of the correlation between the objects, based on the correlation degree between the objects which is calculated by the simultaneous appearance correlation degree calculating unit and the transition appearance correlation degree calculating unit.

3. The information processing apparatus according to claim 1, wherein the simultaneous appearance correlation degree calculating unit calculates an importance degree of each object, based on the appearance section of each object which is obtained by the appearance section obtaining unit, and the display control unit controls the display of a size of an object image showing the object in the diagram of the correlation between the objects, based on the importance degree of each object which is calculated by the simultaneous appearance correlation degree calculating unit.

4. The information processing apparatus according to claim 1, wherein the display control unit controls a moving image display in the diagram of the correlation between the objects, based on the correlation degree between the objects which is calculated at each predetermined time interval by the simultaneous appearance correlation degree calculating unit and the transition appearance correlation degree calculating unit.

5. The information processing apparatus according to claim 1, wherein the display control unit controls a display on a timeline in the diagram of the correlation between the objects, based on the correlation degree between the objects which is calculated at each predetermined time interval by the simultaneous appearance correlation degree calculating unit and the transition appearance correlation degree calculating unit.

6. The information processing apparatus according to claim 1, further comprising:
a digest generating unit that generates a digest of the contents to be configured by a scene where the plurality of objects which are connected with the selected object image or the selected link appear, depending on selection of the object image or the link showing the relationship degree between the objects, in the diagram of the correlation between the objects of which the display is controlled by the display control unit.

7. The information processing apparatus according to claim 1, further comprising:
a cut point inserting unit that inserts a cut point into the scene where the plurality of objects which are connected with the selected object image or the selected link appear, depending on the selection of the object image or the link showing the relationship degree between the objects, in the diagram of the correlation between the objects of which the display is controlled by the display control unit.

8. The information processing apparatus according to claim 1, further comprising:
a database of the correlation degree between persons that stores the correlation degree between the objects which is calculated by the simultaneous appearance correlation degree calculating unit and the transition appearance correlation degree calculating unit.

9. The information processing apparatus according to claim 8, further comprising:
an input unit that inputs an object name; and
a search unit that searches for the correlation degree of the object corresponding to the object name which is input by the input unit, from the database of the correlation degree between the persons,
wherein the display control unit controls the display of the diagram of the correlation between the objects centering around the object which is searched for by the search unit.

10. The information processing apparatus according to claim 8, further comprising:
an input unit that inputs a setting of the diagram of the correlation between the objects; and
a search unit that searches for the correlation degree of the object corresponding to the setting of the diagram of the correlation between the objects which is input by the input unit, from the database of the correlation degree between the persons.

11. The information processing apparatus according to claim 8, further comprising:
a candidate obtaining unit that obtains a candidate list by detecting all faces that appear in the image and adding a person having a large similarity degree with respect to the detected face, using the database of the correlation degree between the persons; and
a person determining unit that determines the person, using the candidate list which is obtained by the candidate obtaining unit.

12. The information processing apparatus according to claim 11,
wherein the person determining unit determines the person, taking the correlation degree of the candidate list which is obtained by the candidate obtaining unit as an evaluation value.

13. The information processing apparatus according to claim 11,
wherein the person determining unit determines the person, taking a value which is obtained by the combination of the correlation degree of the candidate list which is obtained by the candidate obtaining unit and the similarity degree of each person as an evaluation value.

14. The information processing apparatus according to claim 1,
wherein the part of the object is a face image, and the object is a person.

15. An information processing method comprising:
steps performed by an information processing apparatus;
detecting a part of an object from contents and performing grouping for each object based on each time the object appears in the content;
calculating a correlation degree in time between all of the objects of which the grouping is performed, the correlation degree including correlation between plural objects which alternately appear in time in the content without appearing at a same time in the content;

and controlling a display of a diagram of a correlation between the objects indicating the correlation in time between appearance of the objects in the content, based on the correlation degree between the objects which is calculated, wherein the step of calculating the correlation degree calculating unit includes obtaining an appearance section of each object, calculating the correlation degree from a frequency where a plurality of objects appear at the same time, based on the appearance section of each object which is obtained by the obtaining appearance section step, and calculating the correlation degree from a frequency where the plurality of objects appear by transiting in terms of time, based on the appearance section of each object which is obtained by the obtaining appearance section step.

16. A non-transitory computer readable storage medium embodied with a computer program causing a computer to function as:
    a grouping unit that detects a part of an object from contents and performs grouping for each object based on each time the object appears in the content;
    a correlation degree calculating unit that calculates a correlation degree in time between all of the objects of which the grouping is performed by the grouping unit, the correlation degree including correlation between plural objects which alternately appear in time in the content without appearing at a same time in the content;
    and a display control unit that controls a display of a diagram of a correlation between the objects indicating the correlation in time between appearance of the objects in the content, based on the correlation degree between the objects which is calculated by the correlation degree calculating unit, wherein the correlation degree calculating unit includes an appearance section obtaining unit that obtains an appearance section of each object, a simultaneous appearance correlation degree calculating unit that calculates the correlation degree from a frequency where a plurality of objects appear at the same time, based on the appearance section of each object which is obtained by the appearance section obtaining unit, and a transition appearance correlation degree calculating unit that calculates the correlation degree from a frequency where the plurality of objects appear by transiting in terms of time, based on the appearance section of each object which is obtained by the appearance section obtaining unit.

17. The information processing method according to claim 15, further comprising the step of controlling the display of a width of a link showing a relationship degree between the objects in the diagram of the correlation between the objects, based on the correlation degree between the objects which is calculated by the correlation degree of objects appearing at the same time step and the correlation degree of objects appearing by the transiting in time step.

18. The information processing method according to claim 15, wherein the correlation degree of objects appearing at the same time step calculates an importance degree of each object, based on the appearance section of each object which is obtained by the obtaining appearance section step, and the controlling the display step controls the display of a size of an object image showing the object in the diagram of the correlation between the objects, based on the importance degree of each object which is calculated by the correlation degree of objects appearing at the same time step.

19. The information processing method according to claim 15, wherein the controlling the display step controls a moving image display in the diagram of the correlation between the objects, based on the correlation degree between the objects which is calculated at each predetermined time interval by the correlation degree of objects appears at the same time step and the correlation degree of objects appears by transiting in time step.

20. The information processing method according to claim 15, wherein the controlling the display step controls a display on a timeline in the diagram of the correlation between the objects, based on the correlation degree between the objects which is calculated at each predetermined time interval by the correlation degree of objects appearing at the same time step and the correlation degree of objects appearing by transiting in time step.

21. The information processing method according to claim 15, further comprising the step of:
    generating a digest of the contents to be configured by a scene where the plurality of objects which are connected with the selected object image or the selected link appear, depending on selection of object image or the link showing the relationship degree between the objects, in the diagram of the correlation between the objects of which the display is controlled by the controlling the display step.

22. The information processing method according to claim 15, further comprising the step of:
    Inserting a cut point into the scene where the plurality of objects which are connected with the selected object image or the selected link appear, depending on the selection of the object image or the link showing the relationship degree between the objects, in the diagram of the correlation between the objects of which the display is controlled by the controlling the display step.

23. The information processing method according to claim 15, further comprising a step of:
    storing in a database, of the correlation degree between persons, the correlation degree between the objects which is calculated by the correlation degree of objects appearing at the same step and the correlation degree of objects appearing by transiting in time step.

24. The information processing method according to claim 23, further comprising the step of:
    inputting an object name; and searching for the correlation degree of the object corresponding to the object name which is input by the input step, from the database of the correlation degree between the persons, wherein the controlling the display step controls the display of the diagram of the correlation between the objects centering around the object which is searched for by the searching step.

25. The information processing method according to claim 23, further comprising the step of:
    Inputting a setting of the diagram of the correlation between the objects; and searching for the correlation degree of the object corresponding to the setting of the diagram of the correlation between the objects which is input by the input step, from the database of the correlation degree between the persons.

26. The information processing method according to claim 23, further comprising the step of:
    obtaining a candidate list by detecting all faces that appear in the image and adding a person having a large similarity degree with respect to the detected face, using the database of the correlation degree between the persons; and
    determining the person, using the candidate list which is obtained by the candidate obtaining step.

27. The information processing method according to claim 26, wherein the person determining step determines the person, taking the correlation degree of the candidate list which is obtained by the candidate obtaining step as an evaluation value.

28. The information processing method according to claim 26, wherein the person determining step determines the person, taking a value which is obtained by the combination of the correlation degree of the candidate list which is obtained by the candidate obtaining step and the similarity degree of each person as an evaluation value.

29. The information processing method according to claim 15, wherein the part of the object is a face image, and the object is a person.

* * * * *